(12) United States Patent
Yagyu et al.

(10) Patent No.: US 12,033,548 B2
(45) Date of Patent: Jul. 9, 2024

(54) DISPLAY CONTROL DEVICE AND DISPLAY CONTROL PROGRAM PRODUCT

(71) Applicant: DENSO CORPORATION, Kariya (JP)

(72) Inventors: Akihiko Yagyu, Kariya (JP); Daisuke Takemori, Kariya (JP); Yasuhiro Shimizu, Kariya (JP); Kazuki Kojima, Kariya (JP); Shiori Maneyama, Kariya (JP); Takeshi Hatoh, Kariya (JP)

(73) Assignee: DENSO CORPORATION, Kariya (JP)

( * ) Notice: Subject to any disclaimer, the term of this patent is extended or adjusted under 35 U.S.C. 154(b) by 328 days.

(21) Appl. No.: 17/671,115

(22) Filed: Feb. 14, 2022

(65) Prior Publication Data

US 2022/0172652 A1 Jun. 2, 2022

Related U.S. Application Data

(63) Continuation of application No. PCT/JP2020/028037, filed on Jul. 20, 2020.

(30) Foreign Application Priority Data

Aug. 23, 2019 (JP) .................................. 2019-153138
Jul. 6, 2020 (JP) .................................. 2020-116683

(51) Int. Cl.
*G09G 3/00* (2006.01)
*G06V 20/56* (2022.01)

(52) U.S. Cl.
CPC .......... *G09G 3/002* (2013.01); *G06V 20/588* (2022.01); *G09G 2310/08* (2013.01); *G09G 2340/12* (2013.01); *G09G 2380/10* (2013.01)

(58) Field of Classification Search
None
See application file for complete search history.

(56) References Cited

U.S. PATENT DOCUMENTS

| | | | | |
|---|---|---|---|---|
| 2010/0153000 | A1* | 6/2010 | Akita | G01C 21/3632 715/764 |
| 2010/0268452 | A1* | 10/2010 | Kindo | G01C 21/3658 345/632 |
| 2016/0327402 | A1 | 11/2016 | Funabiki et al. | |
| 2020/0282832 | A1* | 9/2020 | Watanabe | H04N 5/74 |

FOREIGN PATENT DOCUMENTS

| | | |
|---|---|---|
| JP | 2006284458 A | 10/2006 |
| JP | 2013029330 A | 2/2013 |
| JP | 2015011458 A | 1/2015 |
| JP | 2018173399 A | 11/2018 |
| WO | WO-2015118859 A1 | 8/2015 |

* cited by examiner

*Primary Examiner* — James A Thompson
*Assistant Examiner* — Kim Thanh T Tran
(74) *Attorney, Agent, or Firm* — Harness, Dickey & Pierce, P.L.C.

(57) ABSTRACT

A display control device is used in a vehicle to control a display of a head-up display The display control device acquires external information based on recognition of a traveling environment around the vehicle, and causes the head-up display to display a superimposition content for providing a route guidance to be superimposed on a foreground in a guidance area. Further, the display control device causes the head-up display to end a display of the superimposition content at a timing based on an end determination using at least the external information.

22 Claims, 22 Drawing Sheets

FIG. 8
STOP INTERSECTION
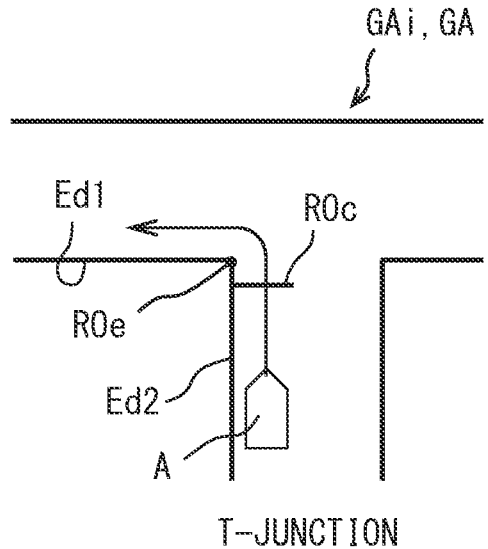
T-JUNCTION
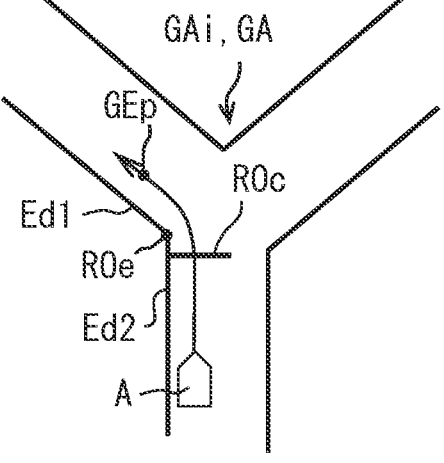
Y-JUNCTION
FIG. 9
COMPARISON BETWEEN RIGHT TURN SCENE AND LEFT TURN SCENE
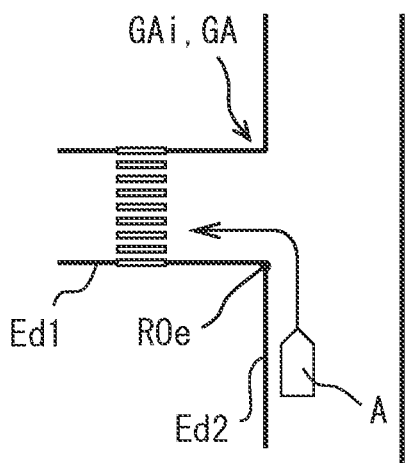
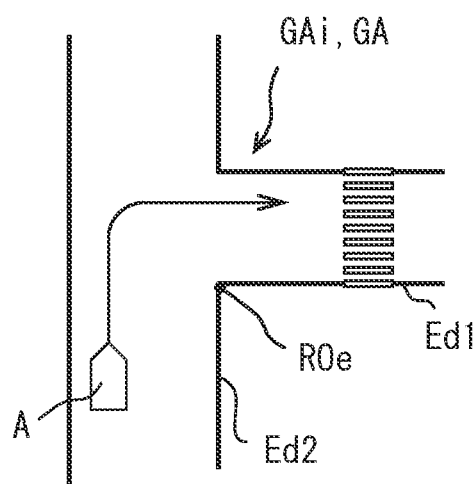

DISPLAY CONTROL DEVICE AND DISPLAY CONTROL PROGRAM PRODUCT

CROSS REFERENCE TO RELATED APPLICATIONS

The present application is a continuation application of International Patent Application No. PCT/JP2020/028037 filed on Jul. 20, 2020, which designated the U.S. and claims the benefit of priority from Japanese Patent Applications No. 2019-153138 filed on Aug. 23, 2019 and No. 2020-116683 filed on Jul. 6, 2020. The entire disclosures of all of the above applications are incorporated herein by reference.

TECHNICAL FIELD

The present disclosure relates to a display control device and a display control program product for controlling display by a head-up display.

BACKGROUND

In a display control device for controlling display by a head-up display, it is known to cause the head-up display to display a guidance display, such as an arrow, for providing a route guidance of a left or right turn in a superimposed manner on a foreground.

SUMMARY

The present disclosure described a display control device and a display control program product for controlling a display by a head-up display in a vehicle. The display control device acquires external information based on recognition of a traveling environment around the vehicle, and causes the head-up display to display a superimposition content for providing a route guidance to be superimposed on a foreground in a guidance area. Further, the display control device causes the head-up display to end a display of the superimposition content at a timing based on an end determination using at least the external information. Thus, the display control device presents information that will not give a sense of discomfort to an occupant.

BRIEF DESCRIPTION OF DRAWINGS

Features and advantages of the present disclosure will become more apparent from the following detailed description made with reference to the accompanying drawings, in which:

FIG. 8 is a diagram for explaining details of a route guidance at a stop intersection;

FIG. 9 is a diagram for explaining a route guidance while comparing between a right turn scene and a left turn scene;

DETAILED DESCRIPTION

Figure 1:
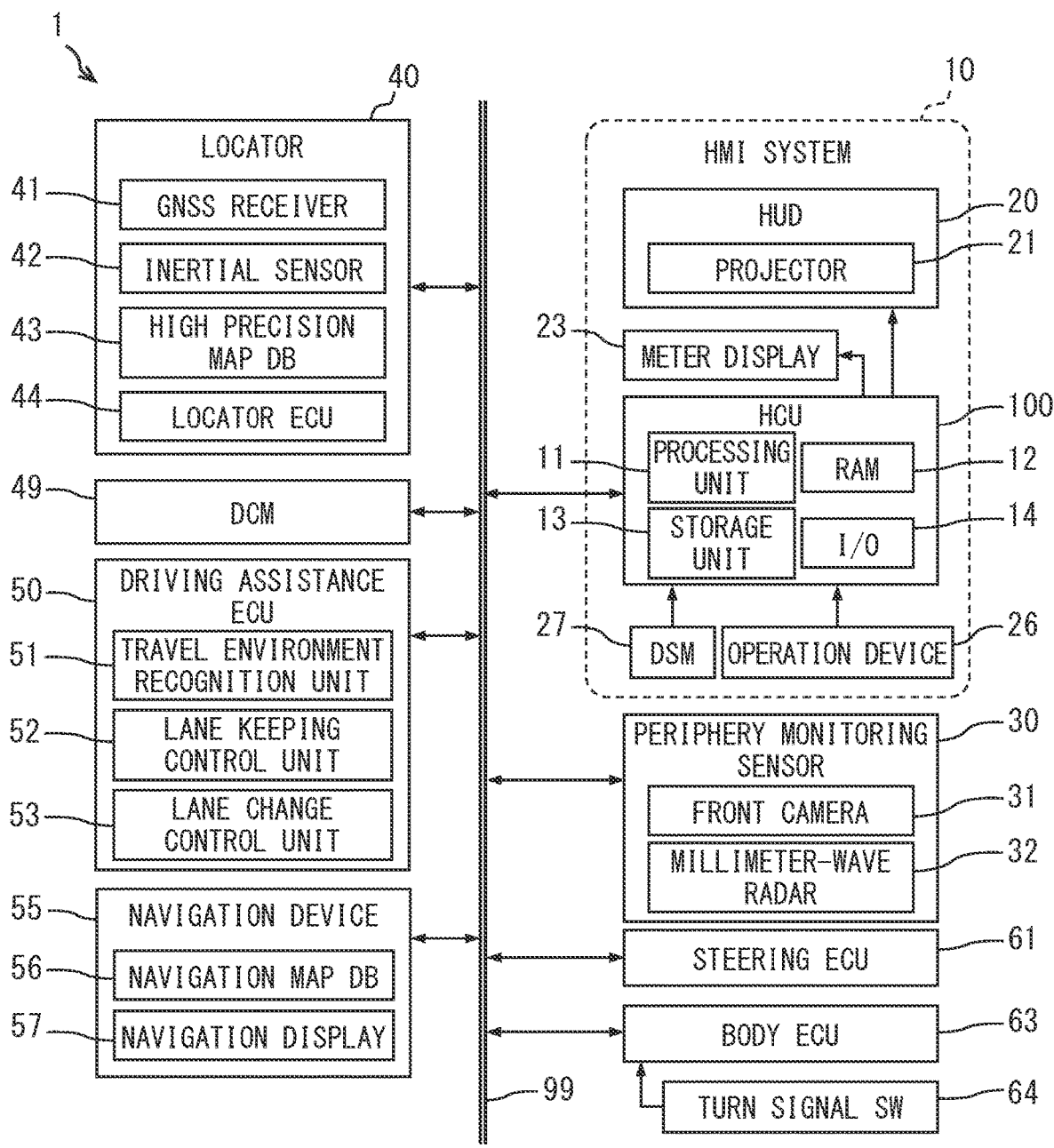
FIG. 1 is a diagram illustrating an overview of an in-vehicle network including an HCU according to a first embodiment of the present disclosure.

In a display control device that causes a head-up display to display a guidance display, such as an arrow, for providing a route guidance of a left or right turn in a superimposed manner on a foreground. In such a display control device, it is known to control a timing to start the guidance display according to various conditions. However, it is not known to control a timing to end the guidance display. If the timing to end the guidance display is not set appropriately, presentation of information may give a sense of discomfort to an occupant.

The present disclosure provides a display control device and a display control program product for controlling a display by a head-up display in a vehicle, which are capable of presenting information without discomfort to an occupant.

According to a first aspect of the present disclosure, a display control device is to control a head-up display of a vehicle that is equipped with a navigation device for performing a route guidance. The display control device includes: a navigation information acquisition unit configured to acquire navigation information related to the route guidance performed by the navigation device; an external information acquisition unit configured to acquire external information based on recognition of a traveling environment around the vehicle; and a display control unit configured to cause the head-up display to display a superimposition content for providing a route guidance to be superimposed on a foreground in a guidance area where the route guidance by the navigation device is performed. Further, the display control unit is configured to cause the head-up display to end a display of the superimposition content at a timing before the vehicle passes through the guidance area, based on an end determination using at least the external information, without using an end notification that notifies an end of the route guidance by the navigation device.

According to a second aspect of the present disclosure, a display control program product is for controlling a head-up display of a vehicle that is equipped with a navigation device for performing a route guidance. The display control program product is stored on a non-transitory computer readable medium, and includes instructions configured to, when executed by one or more processors, cause the one or more processors to: acquire navigation information related to the route guidance performed by the navigation device; acquire external information based on recognition of a traveling environment around the vehicle; cause the head-up display to display a superimposition content for providing a route guidance to be superimposed on a foreground in a guidance area where the route guidance is performed by the navigation device; and cause the head-up display to end a display of the superimposition content at a timing before the vehicle passes through the guidance area, based on an end determination using the external information, without using an end notification that notifies an end of the route guidance by the navigation device.

In the configurations according to the first and second aspects, by performing the end determination using at least the external information around the vehicle, the display of the superimposition content for providing the route guidance can be ended at an appropriate timing without depending on the end timing of the route guidance by the navigation device. According to the above, even if the superimposition content is used, it is possible to present information that does not give a sense of discomfort to the occupant.

According to a third aspect of the present disclosure, a display control device is to control a screen display and a head-up display of a vehicle, and the display control device includes: an external information acquisition unit configured to acquire external information based on recognition of a traveling environment around the vehicle; and a display control unit configured to cause the head-up display to display a superimposition content for providing a route guidance to be superimposed on a foreground in a guidance area where the display control unit causes the screen display to display a route guidance image. Further, the display control unit is configured to cause the head-up display to end a display of the superimposition content at a timing before the display control unit causes the screen display to end a display of the route guidance image and before the vehicle passes through the guidance area, based on an end determination using at least the external information.

According to a fourth aspect of the present disclosure, a display control device is to control a head-up display of a vehicle that is equipped with a navigation device for performing a route guidance. The display control device includes: a navigation information acquisition unit configured to acquire navigation information related to the route guidance performed by the navigation device; an external information acquisition unit configured to acquire external information based on recognition of a traveling environment around the vehicle; and a display control unit configured to cause the head-up display to display a superimposition content for providing a route guidance to be superimposed on a foreground in a guidance area where the navigation device displays a route guidance image on a screen. Further, the display control unit is configured to cause the head-up display to end a display of the superimposition content at a timing before the navigation device ends a display of the route guidance image and before the vehicle passes through the guidance area, based on an end determination using at least the external information.

According to a fifth aspect of the present disclosure, a display control program product is for controlling a screen display and a head-up display of a vehicle. The display control program product is stored on a non-transitory computer readable medium, and includes instructions configured to, when executed by one or more processors, cause the one or more processors to: acquire external information based on recognition of a traveling environment around the vehicle; cause the head-up display to display a superimposition content for providing a route guidance to be superimposed on a foreground, in a guidance area in which the screen display is caused to display a route guidance image on a screen; and cause the head-up display to end a display of the superimposition content, at a timing before ending a display of the route guidance image by the screen display and before the vehicle passes through the guidance area, based on an end determination using at least the external information.

According to a sixth aspect of the present disclosure, a display control program product is for controlling a head-up display of a vehicle that is equipped with a navigation device for performing a route guidance. The display control program product is stored on a non-transitory computer readable medium, and includes instructions configured to, when executed by one or more processors, cause the one or more processors to: acquire navigation information related to the route guidance performed by the navigation device; acquire external information based on recognition of a traveling environment around the vehicle; cause the head-up display to display a superimposition content for providing a route guidance to be superimposed on a foreground in a guidance area in which the navigation device displays a route guidance image on a screen; and cause the head-up display to end a display of the superimposition content at a timing before the navigation device ends a display of the route guidance image and before the vehicle passes through the guidance area, based on an end determination using at least the external information.

In the configurations according to the third to sixth aspects, by performing the end determination using at least the external information around the vehicle, the display of the superimposition content for providing the route guidance can be appropriately ended at a timing earlier than the display end timing of the route guidance image. According to the above, even if the superimposition content is used, it is possible to present information that does not give a sense of discomfort to the occupants.

According to a seventh aspect of the present disclosure, a display control device is to control a head-up display of a vehicle that has a lane change function, and the display control device includes: an external information acquisition unit configured to acquire external information based on recognition of a traveling environment around the vehicle, and a display control unit configured to cause the head-up display to display a superimposition content indicating a moving direction in a lane change performed by the lane change function to be superimposed on a foreground, and to cause the head-up display to end a display of the superimposition content at a timing before a drive control of the vehicle is transitioned from the lane change to an in-lane traveling, based on an end determination using at least the external information.

According to an eighth aspect of the present disclosure, a display control program product is for controlling a head-up display of a vehicle having a lane change function. The display control program product is stored on a non-transitory computer readable medium, and includes instructions configured to, when executed by one or more processors, cause the one or more processors to: acquire external information based on recognition of a traveling environment around the vehicle in a scene where a lane change is performed by the lane change function; cause the head-up display to display a superimposition content indicating a moving direction in the lane change to be superimposed on a foreground; and cause the head-up display to end a display of the superimposition content at a timing before a drive control is transitioned from the lane change to an in-lane traveling, based on an end determination using at least the external information.

In the configurations according to the seventh and eighth aspects, by performing the end determination using at least the external information around the vehicle, the display of the superimposition content indicating the moving direction in the lane change can be ended at an appropriate timing. As such, even if the superimposition content is used, it is possible to present information that does not give a sense of discomfort to the occupants.

Hereinafter, a plurality of embodiments of the present disclosure will be described with reference to the drawings. The corresponding or equivalent components are designated with the same reference numerals throughout the embodiments, and descriptions thereof will not be repeated. When only a part of the configuration is described in an embodiment, the other parts of the embodiment can be provided by the parts of the embodiment(s) described precedingly. Further, not only the combinations of the configurations explicitly shown in the description of the respective embodiments, but also the configurations of the plurality of embodiments can be partially combined even if the combinations are not explicitly shown if there is no problem in the combination in particular. Unspecified combinations of the configurations described in the plurality of embodiments and the modifications are regarded as being also disclosed in the following description.

First Embodiment

Figure 2:
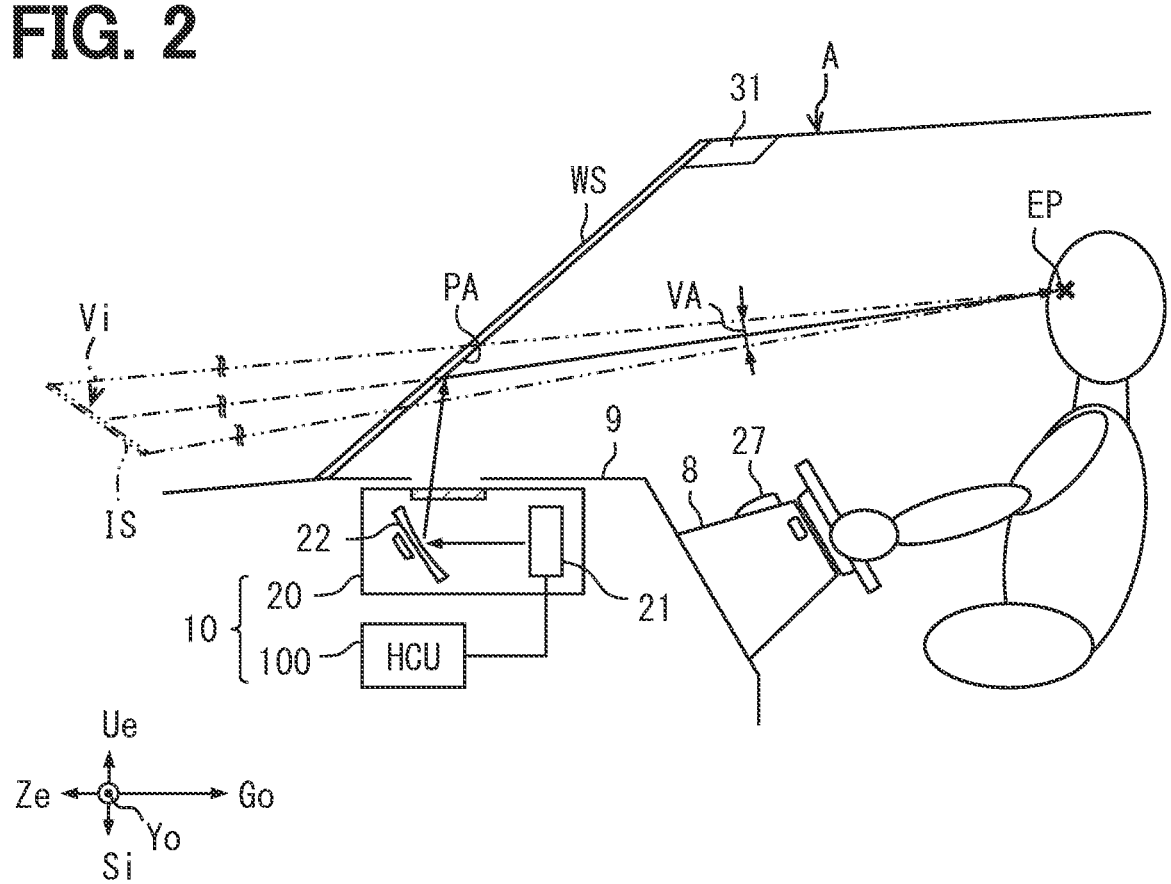
FIG. 2 is a diagram illustrating an example of a head-up display mounted on a vehicle.

Functions of a display control device according to a first embodiment of the present disclosure is provided by a human machine interface (HMI) control unit 100 shown in FIGS. 1 and 2. Hereinafter, the HMI control unit 100 is also referred to as an HCU 100. The HCU 100 constitutes a human machine interface (HMI) system 10 used in a vehicle A together with a head-up display (hereinafter, HUD) 20 and the like. The HMI system 10 further includes a meter display 23, an operation device 26, a DSM (Driver Status Monitor) 27, and the like. The HMI system 10 has an input interface function that accepts a user's operation made by an occupant (for example, a driver) of the vehicle A, and an output interface function that presents information to the driver.

The HMI system 10 is communicably connected to a communication bus 99 of an in-vehicle network 1 mounted on the vehicle A. To the communication bus 99, a periphery monitoring sensor 30, a locator 40, a data communication module (DCM) 49, a driving assistance electronic control unit (ECU) 50, a navigation device 55, a steering ECU 61, a body ECU 63, and the like are connected. These nodes connected to the communication bus 99 can communicate with one another. The specific nodes of these devices and ECUs may be electrically, directly connected to each other to communicate with each other without passing through the communication bus 99.

In the following description, a front-rear direction (see FIG. 2, Ze corresponding to forward, and Go corresponding to rearward) and a left-right direction (see FIG. 2, Yo corresponding to sideways) are defined with reference to the vehicle A motionlessly stationed on a horizontal plane. Specifically, the front-rear direction is defined along the longitudinal direction (traveling direction) of the vehicle A. The left-right direction is defined along a width direction of the vehicle A. Further, a vertical direction (see FIG. 2, Ue corresponding to upward and Si corresponding to downward) is defined along a direction vertical to the horizontal plane that defines the front-rear direction and the left-right direction. It is to be noted that, for the sake of simplification of the description, the description of the reference numeral indicating each direction may be omitted as appropriate.

The periphery monitoring sensor 30 is an autonomous sensor that monitors a peripheral environment of the vehicle A. The periphery monitoring sensor 30 can detect in a detection range around the subject vehicle moving objects such as pedestrians, cyclists, animals other than humans, and other vehicles, as well as stationary objects such as falling objects, guardrails, curbs, road signs, markings on a road surface including traveling lane markings, and road edges. The periphery monitoring sensor 30 provides detection information of detecting an object around the vehicle A to the driving assistance ECU 50 and the like via the communication bus 99.

The periphery monitoring sensor 30 includes a front camera 31, a millimeter wave radar 32, and the like as detection configurations for object detection. The front camera 31 outputs at least one of image data obtained by photographing the front range of the vehicle A and an analysis result of the image data, as detection information. The multiple millimeter wave radars 32 are arranged, for example, on the front and rear bumpers of the vehicle A at intervals from each other. The millimeter wave radar 32 emits millimeter waves or quasi-millimeter waves toward a front range, a front side range, a rear range, a rear side range, or the like of the vehicle A. The millimeter wave radar 32 generates detection information by a process of receiving reflected waves reflected by moving objects, stationary objects, or the like. The periphery monitoring sensor 30 may include detection configurations such as a LiDAR and a sonar.

The locator 40 generates highly accurate position information of the vehicle A by a complex positioning method that combines multiple types and pieces of acquired information. The locator 40 includes a global navigation satellite system (GNSS) receiver 41, an inertial sensor 42, a high-precision map database (hereinafter, high-precision map DB) 43, and a locator ECU 44.

The GNSS receiver 41 receives positioning signals transmitted from multiple artificial satellites, such as positioning satellites. The inertial sensor 42 includes a gyro sensor and an acceleration sensor, for example. The high-precision map DB 43 is mainly composed of a non-volatile memory, and stores map data (hereinafter, high-precision map data) having higher accuracy than the map data used in the navigation device 55. The high-precision map data has detailed information at least for information in the height (z) direction. The high-precision map data contains information that can be used for advanced driving assistance and automated driving, such as three-dimensional shape information about roads, information about the number of lanes, and information indicating a travelling direction allowed for each lane.

The locator ECU 44 mainly includes a microcomputer equipped with a processor, RAM, a storage unit, an input/output interface, and a bus connecting these elements. The locator ECU 44 combines positioning signal received by the GNSS receiver 41, measurement result of the inertial sensor 42, vehicle speed information output to the communication bus 99, and the like, and successively specifies the position and the travelling direction of the vehicle A. The locator ECU 44 can provide position information and direction information of the vehicle A based on the positioning result to the navigation device 55, the HCU 100, the driving assistance ECU 50 and the like as the locator information. In response to requests from the HCU 100, the driving assistance ECU 50 and the like, the locator ECU 44 can provide the requested high-precision map data to the requesting ECU.

The DCM 49 is a communication module mounted on the subject vehicle A. The DCM49 transmits and receives radio waves to and from base stations around the vehicle A by wireless communication compliant with communication standards such as long term evolution (LTE) and 5G. The DCM 49, when mounted, enables the vehicle A to be connect to the Internet. The DCM49 can receive the latest high-precision map data from a cloud server. The DCM49 cooperates with the locator ECU 44 to update the high-precision map data stored in the high-precision map DB 43 to the latest information.

The driving assistance ECU 50 mainly includes a computer equipped with a processor, RAM, a storage unit, an input/output interface, a bus connecting these elements, and the like. The driving assistance ECU 50 has a driving assistance function to assist the driving operation of a driver. As an example, the driving assistance ECU 50 enables advanced driving support of about level 2 at the automatic driving level specified by the American Society of Automotive Engineers of Japan. The driving assistance ECU 50 has a travel environment recognition unit 51, a lane keeping control unit 52, and a lane change control unit 53 as functional units for driving assistance by executing programs by a processor.

The travel environment recognition unit 51 recognizes a traveling environment around the vehicle A based on the detection information acquired from the periphery monitoring sensor 30. The travel environment recognition unit 51 recognizes lane markings of a road, vehicles in front, parallel vehicles, etc. As targets related to driving controls in the lane keeping control unit 52 and the lane change control unit 53. The travel environment recognition unit 51 generates information indicating a relative position of the recognized target, and the like.

In addition to the target directly related to the driving controls, the travel environment recognition unit 51 can recognize a target related to a route guidance, and generate information indicating a relative position of the recognized target and information indicating a type of the recognized target. More specifically, when the vehicle A approaches an intersection GAi (see FIG. 4), the travel environment recognition unit 51 recognizes a target related to the intersection GAi (hereinafter referred to as an intersection target). The intersection target is a target existing near or before the intersection GAi, and specifically, a road sign on the side of a road, sidewalk lines ROa, ROb, a stop line ROc, and the like. In addition, the travel environment recognition unit 51 can detect edges of the roads forming the intersection GAi, and can recognize an intersection point of the two edges of the roads (hereinafter, edge intersection ROe, see FIG. 4). As an example, the travel environment recognition unit 51 detects two edges on the near side and on the turning side of the intersection GAi, and recognizes the edge intersection ROe of the two edges as the intersection target. The travel environment recognition unit 51 detects edges Ed1 and Ed2 on the near side and turning side at any intersection GAi. That is, the travel environment recognition unit 51 detects the edges Ed1 and Ed2 on the near side and the turning side not only at the crossroads, but also in various types of intersections GAi such as multi-road junction, Y-junction, T-junction, and roundabouts (see FIGS. 6 to 9 and 22). Further, the travel environment recognition unit 51 recognizes the edge intersection ROe of the detected edges Ed1 and Ed2.

Figure 10:
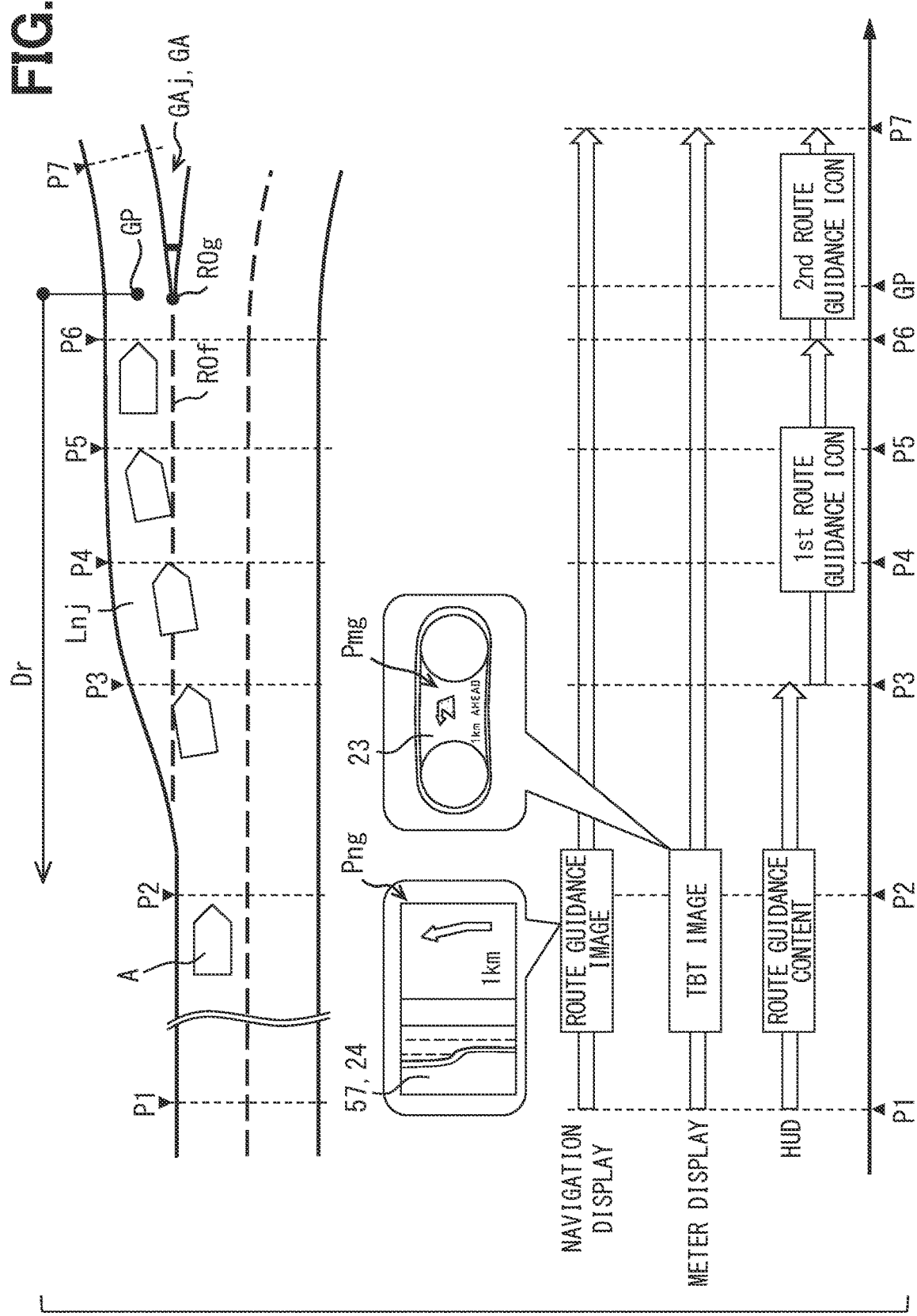
FIG. 10 is a diagram illustrating details of display transitions of a guidance by each in-vehicle display device in a scene of left branch.

When the vehicle A approaches the branch point GAj (see FIG. 10) or the merging point, the travel environment recognition unit 51 recognizes a target related to such a branch or merging point (hereinafter referred to as a point target). The point target is a target existing near or before the branch or merging point, and is, for example, a signboard showing the distance to the branch or merging point, a boundary line ROf between a main lane and a branch lane Lnj (FIG. 10), and a terminal ROg of the branch point GAj (FIG. 10). The travel environment recognition unit 51 outputs an intersection target information based on the recognition of the intersection target, a point target information based on the recognition of the point target, and the like to the communication bus 99.

The lane keeping control unit 52 is a functional unit that realizes a function of a lane trace control (LTC) or a lane tracing assist (LTA), which controls the traveling of the vehicle A in the lane. The lane keeping control unit 52 generates a scheduled traveling trajectory that traces approximately the center of a traveling lane on which the vehicle A is currently traveling based on the recognition result of the traveling environment by the traveling environment recognition unit 51 (see FIG. 13). Hereinafter, the traveling lane on which the vehicle A is currently traveling will be referred to as a subject vehicle lane Lns, and the vehicle A will also be referred to as a subject vehicle. The lane keeping control unit 52 links the LTC function with an adaptive cruise control (ACC) function of driving the vehicle A at a constant speed or driving the vehicle A to follow a vehicle in front, to perform a driving control to control the vehicle A to continue the traveling along the subject vehicle lane (hereinafter referred to as the in-lane traveling). The lane keeping control unit 52 sequentially provides status information regarding the LTC function to the HCU 100 through the communication bus 99.

The lane change control unit 53 is a functional unit that realizes a function of a lane change assist (LCA) that controls the lane change of the vehicle A. The lane keeping control unit 52 generates a scheduled traveling trajectory PLC (see FIG. 13) having a shape that smoothly connects the center of the subject vehicle lane Lns and the center of an adjacent lane Lnd (see FIG. 13) based on the recognition result of the traveling environment by the traveling environment recognition unit 51. The lane change control unit 53 temporarily suspends the driving control of the in-lane traveling by the lane keeping control unit 52 based on a user's operation instructing the execution of the lane change by the LCA function, and enables the vehicle A to leave from the subject vehicle lane Lns. Under such a state, the lane change control unit 53 automatically controls the steering angle of the steering wheel of the vehicle A according to the scheduled traveling trajectory PLC so as to move the vehicle A from the subject vehicle lane Lns to the adjacent lane Lnd.

The lane change control unit 53 sequentially provides the HCU 100 with status information regarding the LCA function, shape information of the scheduled traveling trajectory PLC, and the like via the communication bus 99. The status information indicates that the operation state of the LCA function is any of a start-up start state immediately after the start-up, a standby state waiting for the start of the lane change and an execution state.

The navigation device 55 is an in-vehicle device that cooperates with the HMI system 10 to provide route guidance to a destination set by a driver or the like. The navigation device 55 includes a map database for navigation (hereinafter referred to as a navigation map DB) 56 and a navigation display 57. The navigation map DB 56 mainly includes a non-volatile memory, and stores map data used for the route guidance (hereinafter referred to as navigation map data). The navigation map data includes link data, node data, and the like for roads.

Here, the navigation map data and the high precision map data are map data having different accuracy from each other. For a specific area, the information stored in the high precision map data is more accurate and denser than the information stored in the navigation map data. The range of high-precision map data is limited to specific types of roads (for example, highways, etc.), whereas the navigation map data is comprehensively maintained in a wide area including general roads though the navigation map data being low-precision map data.

The navigation display 57 is an image display such as a liquid crystal display or an organic EL display. The navigation display 57 is installed, for example, in the center of an upper surface of an instrument panel 9, a center cluster, or the like. On the display screen of the navigation display 57, for example, a route guidance image Png (see FIGS. 4 and 10), a map image based on the navigation map data, route information toward the destination, and the like are displayed.

The navigation device 55 acquires the operation information input to the operation device 26, and sets a destination based on the user's operation and a route to the destination. As the vehicle A approaches a guidance area GA included in the set route, the navigation device 55 guides a traveling direction of the vehicle A in the guidance area GA together with the screen display by the navigation display 57, a voice message, and the like.

The guidance area GA is a point in which the route guidance is performed. The guidance area GA is set to include an intersection GAi (see FIG. 4) for turning left and right, a junction (branch or merging point), and the like, as well as a range before these areas. Further, the guidance area GA may be set in the vicinity of the destination and a waypoint. The navigation device 55 provides the HCU 100 with navigation information such as a start notification for notifying the start of route guidance, an end notification for notifying the end of route guidance, and detailed route information indicating the contents of the route guidance, in the guidance area GA. The detailed route information includes, for example, position information and road shape information about the intersection GAi or the branch or merging point, and direction information indicating the direction in which the vehicle A should travel at the intersection GAi or the junction.

For example, instead of the navigation device 55, a user terminal such as a smartphone may be electrically connected to the in-vehicle network 1 or the HCU 100 with wire or wirelessly. Such a user terminal may be connected to the display audio mounted on the vehicle A with wire or wirelessly. The route to the destination may be set in an application (navigation application, map application, etc.) executed on the user terminal based on the user's operation. Similar to the navigation device 55, the user terminal may execute a route guidance in combination with a screen display, voice message, and the like, and outputs navigation information toward the HCU 100. In this case, the user terminal or the combination of the user terminal and the display audio may correspond to the "navigation device mounted on the vehicle A".

The steering ECU 61 is an ECU provided in the steering control system of the vehicle A, and has a configuration mainly including a microcontroller. The steering ECU 61 controls the operation of a steering actuator based on at least one of a steering operation by a driver and a control command acquired from the driving assistance ECU 50, thereby controlling the direction of driving wheels and the traveling direction of the vehicle A. The steering ECU 61 can provide, as steering information, a rotation direction and a rotation angle (steering wheel angle) of the steering wheel or a steering direction of the driving wheels and actual steering angle to the driving assistance ECU 50, the HCU 100, and the like.

The body ECU 63 is a control device including a microcontroller as a main configuration. The body ECU 63 has at least a function of controlling the operation of a lighting device mounted on the vehicle A. The body ECU 63 is electrically connected to a turn signal switch 64. The turn signal switch 64 is a lever-shaped operation unit provided on a steering column unit 8. The body ECU 63 starts to blink one of a left turn signal or a right turn signal, which corresponds to the operation direction applied to the turn signal switch 64, based on the detection of the user operation input to the turn signal switch 56.

In the turn signal switch 64, an on operation for instructing the lane change control unit 53 to execute the lane change control while the LTC function is activated is input, in addition to the normal user's operation for starting the blinking operation of the turn signal. As an example, a user's operation in which the turn signal switch 64 is half-pressed for a predetermined time period (for example, about 1 to 3 seconds) is regarded as the on operation for the LCA function. When detecting the input of the on operation of the LCA function, the body ECU 63 outputs the on operation information to the driving assistance ECU 50. The body ECU 63 cooperates with the driving assistance ECU 50 to keep the blinking of the turn signal during the execution period of the lane change by the LCA function. The body ECU 63 provides the HCU 100 with operation information indicating the blinking operation state of the turn signal via the communication bus 99.

The HMI system 10 includes a meter display 23, the operation device 26, the DSM 27, the HUD 20 and the HCU 100. Details of the meter display 23, the operation device 26, the DSM 27, the HUD 20, and the HCU 100 will be described hereinafter in order.

The meter display 23 is mounted on the vehicle A, together with the navigation display 57, the HUD 20, and the like, as one of a plurality of in-vehicle display devices. The meter display 23 is an image display such as a liquid crystal display or an organic EL display. The meter display 23 is installed in front of a driver's seat, and has a display screen directed toward a headrest portion of the driver's seat. The meter display 23 is electrically connected to the HCU 100, and sequentially acquires video data generated by the HCU 100. The meter display 23 displays a pointer display image showing the vehicle speed, an indicator image showing the status information of each in-vehicle function, and the like on the display screen based on the video data. Further, the meter display 23 displays a turn-by-turn (TBT) image Pmg (see FIGS. 4 and 10) for performing the route guidance, a status image showing the operation state of the driving assistance function, and the like on the display screen. The status image includes, for example, a lane change image Pmc (see FIG. 13) for notifying the execution of the lane change in a scene where the lane change by the LCA function is performed.

The operation device 26 is an input unit that accepts an operation of user, such as a driver. The operation device 26 receives the user' operation for switching, for example, between an activated state and a deactivated state of such as the driving support function and the automatic driving function. Specifically, the operation device 26 includes a steering switch provided on a spoke portion of the steering wheel, an operation lever provided on a steering column portion 8, a voice input device for detecting the driver's voice or speech, or the like.

The DSM27 includes a near-infrared light source, a near-infrared camera, and a control unit for controlling the near-infrared light source and the near-infrared camera. The DSM 27 is, for example, installed on the upper surface of the steering column portion 8 or the upper surface of the instrument panel 9 in a position in which the near-infrared camera is directed toward the headrest portion of the driver's seat. The DSM 27 captures, using the near-infrared camera, the driver's head to which the near-infrared light is emitted from the near-infrared light source. The control unit applies image analysis to images captured by the near-infrared camera. The control unit extracts information such as a position of an eye point EP and a sight direction from the captured image, and successively outputs the state information extracted to the HCU 100.

The HUD 20 is electrically connected to the HCU 100 and successively acquires video data generated by the HCU 100. Based on the video data, the HUD 20 presents various information related to the vehicle A, such as route information, sign information, and status information of each in-vehicle function, to the driver using the virtual image Vi.

The HUD 20 is accommodated in a housing space inside the instrument panel 9 below a windshield WS. The HUD 20 projects the light formed as a virtual image Vi toward a projection range PA of the windshield WS. The light projected on the windshield WS is reflected toward the driver's seat in the projection range PA and is perceived by the driver. The driver visually recognizes a display in which a virtual image Vi is superimposed on the foreground visible through the projection range PA.

The HUD 20 includes a projector 21 and a magnifying optical system 22. The projector 21 includes a liquid crystal display (LCD) panel and a backlight. The projector 21 is fixed to a housing of the HUD 20 so that the display surface of the LCD panel faces the magnifying optical system 22. The projector 21 displays each frame image of the video data on the display surface of the LCD panel, and illuminates the display surface with the backlight that transmits the display surface. Thus, the light to be formed as a virtual image VI is emitted toward the magnifying optical system 22. The magnifying optical system 22 is configured to include at least one optical element such as a concave mirror. The magnifying optical system 22 projects the light emitted from the projector 21 on an upper projection range PA while spreading the light by reflection.

The HUD 20 is provided with an angle of view VA. When a virtual range in the space where the virtual image VI can be imaged by the HUD 20 is defined as an imaging plane IS, the angle of view VA is defined as a viewing angle defined based on a virtual line connecting the driver's eye point EP and an outer edge of the image plane IS. The angle of view VA is a range of angle within which the driver can visually recognize the virtual image Vi when viewed from the eye point EP. In the HUD 20, a horizontal angle of view (for example, about 10 degrees to 12 degrees) in the horizontal direction is larger than a vertical angle of view (for example, about 4 degrees to 5 degrees) in the vertical direction. When viewed from the eye point EP, a front range that overlaps with the image plane IS is a range of the angle of view VA.

The HUD 20 displays a superimposition content CTs (see FIG. 5 and the like) and a non-superimposition content CTn (see FIG. 5 and the like) as virtual images Vi. The superimposition content CTs is an AR display object used for augmented reality (hereinafter referred to as "AR") display. The display position of the superimposition content CTs is associated with a specific superimposition target existing in the foreground, such as a specific position on the road surface, a vehicle in front, a pedestrian, and a road sign. The superimposition content CTs is displayed in a superimposing manner on a specific superimposition target in the foreground, and is seemingly fixed relative to the specific superimposition target to be able to follow the specific superimposition target corresponding to the driver's eye line. That is, the relative positional relationship is continuously maintained among the driver's eye point EP, the superimposition target in the foreground, and the superimposition content CTs. Therefore, the shape of the superimposition content CTs is continuously updated at a predetermined cycle according to the relative position and shape of the superimposition target. The superimposition content CTs is displayed in a posture closer to horizontal than the non-superimposition content CTn, and have, for example, a display shape extended in the depth direction as seen from the driver.

The non-superimposition content CTn is a non-AR display object excluding the superimposition content CTs among the display objects displayed in the superimposing manner on the foreground. Unlike the superimposition content CTs, the non-superimposition content CTn is displayed in the superimposing manner on the foreground independently of the superimposition target. The display position of the non-superimposition content CTn is not associated with a specific superimposition target. The non-superimposition content CTn is displayed at a fixed position within the projection range PA (the above-mentioned angle of view VA). Therefore, the non-superimposition content CTn is displayed as if it is relatively fixed to the vehicle configuration such as the windshield WS. In addition, the shape of the non-superimposition content CTn is substantially constant. Note that, due to the positional relationship between the vehicle A and the superimposition target, even the non-superimposition content CTn may have a timing of being superimposedly displayed on the superimposition target of the superimposition content Cts.

The HCU 100 is an electronic control unit that integrally controls the display by the in-vehicle display devices such as the meter display 23 and the HUD 20 in the HMI system 10. The HCU 100 mainly includes a computer equipped with a processing unit 11, a RAM 12, a storage unit 13, an input/output interface 14, and a bus connecting these elements. The processing unit 11 is a hardware combined with the RAM 12, and executes arithmetic processing. The processing unit 11 includes at least one calculation core, such as a central processing unit (CPU) or a graphics processing unit (GPU). The processing unit 11 may further include a field-programmable gate array (FPGA) and an IP core having other dedicated functions. The RAM 12 may include a video RAM for generating video. The processing unit 11 executes various processes for realizing the display control method of the present disclosure by accessing the RAM 12. The storage unit 13 includes a non-volatile storage medium. The storage unit 13 stores various programs (display control programs, etc.) to be executed by the processing unit 11.

Figure 3:
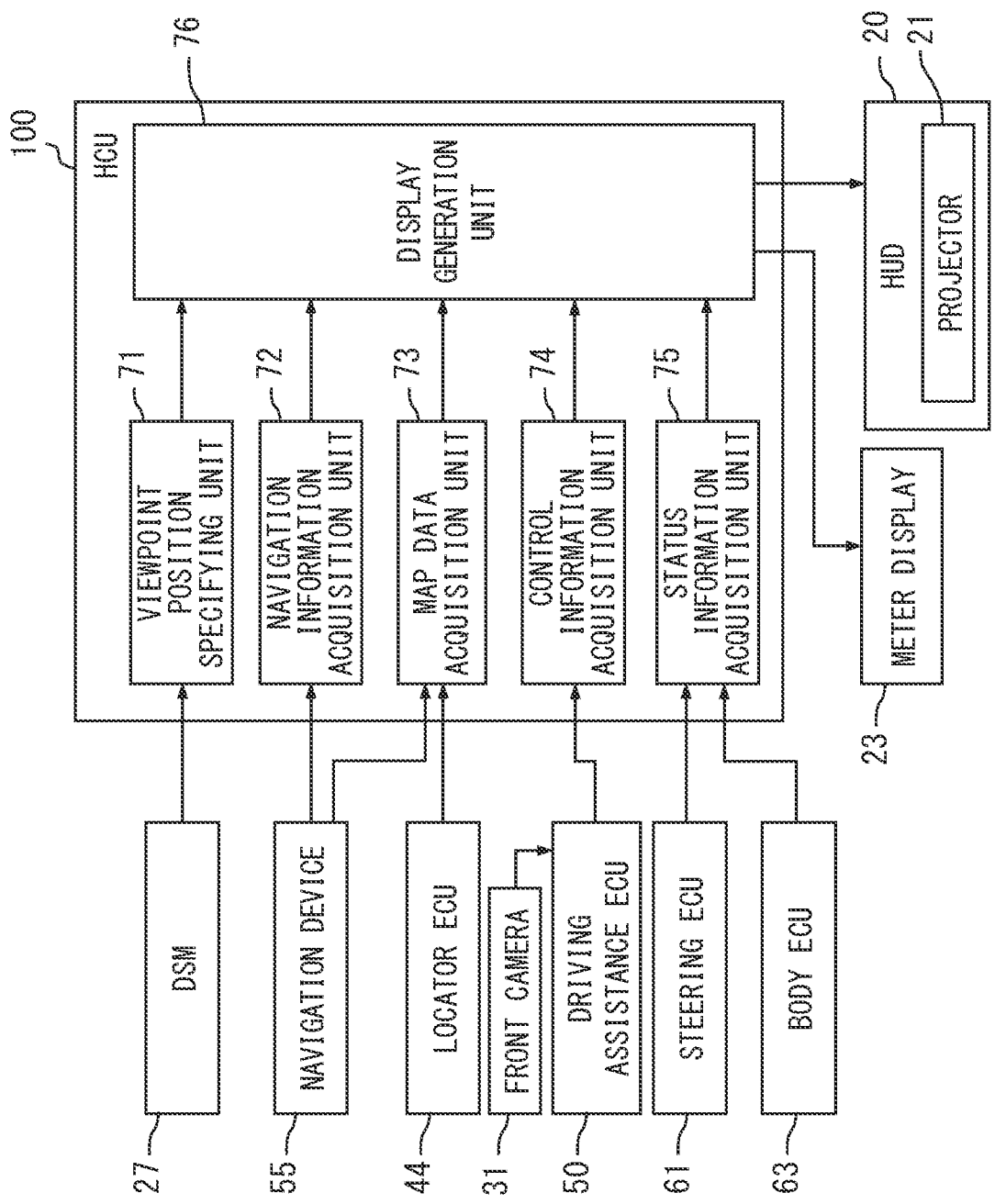
FIG. 3 is a diagram illustrating an example of a schematic configuration of an HCU according to the first embodiment.

The HCU 100 shown in FIGS. 1 to 3 has a plurality of functional units for controlling the superimposition display of the content by the HUD 20 by executing the display control program stored in the storage unit 13 by the processing unit 11. Specifically, the HCU 100 is constructed with functional units such as a viewpoint position specifying unit 71, a navigation information acquisition unit 72, a map data acquisition unit 73, a control information acquisition unit 74, a state information acquisition unit 75, and a display generation unit 76.

The viewpoint position specifying unit 71 specifies a position of the eye point EP of the driver seated on the driver's seat based on the state information acquired from the DSM 27. The viewpoint position specifying unit 71 generates three-dimensional coordinates (hereinafter referred to as eye point coordinates) indicating the position of the eye point EP, and successively provides the generated eye point coordinates to the display generation unit 76.

The navigation information acquisition unit 72 acquires navigation information from the navigation device 55 and provides the acquired navigation information to the display generation unit 76. The navigation information acquisition unit 72 sequentially acquires the start notification, the detailed route information, and the end notification, which are described above, and recognizes the content of the route guidance carried out by the navigation device 55.

The map data acquisition unit 73 can acquire the navigation map data and the high-precision map data, as the map data used by the display generation unit 76 to generate superimposition content CTs. The map data acquisition unit 73 acquires the high-precision map data from the locator ECU 44 together with the locator information in the road range where the high-precision map data is prepared. The map data acquisition unit 73 acquires the navigation map data to be used as a substitute for the high-precision map data in response to a request to the navigation device 55 in a road range where the high-precision map data is not yet prepared. As described above, the navigation device 55 preferentially acquires the high-precision map data over the navigation map data. The navigation device 55 provides the acquired high-precision map data or navigation map data to the display generation unit 76.

The control information acquisition unit 74 acquires external information based on the traveling environment recognition and the status information of each of the LTC function and the LCA function from the driving assistance ECU 50. The control information acquisition unit 74 sequentially provides the acquired external information and the status information to the display generation unit 76. The control information acquisition unit 74 can acquire, as the external information, the intersection target information and the point target information mainly based on the detection information of the front camera 31 in the vicinity of the guidance area GA in which the route guidance is performed. When the LTC function is in the execution state by the driving assistance ECU 50, the control information acquisition unit 74 acquires the left and right boundary recognition information of the subject vehicle lane Lns (see FIG. 13) or the shape information of the scheduled traveling trajectory from the driving assistance ECU 50. When the LCA function is in the execution state by the driving assistance ECU 50, the control information acquisition unit 74 acquires the boundary recognition information of the adjacent lane Lnd (see FIG. 13) and the shape information of the scheduled traveling trajectory PLC (see FIG. 13) from the driving assistance ECU 50. In addition, the control information acquisition unit 74 acquires, as the external information, information indicating a relative position and a shape of the boundary line ROf (see FIG. 13) between the subject vehicle lane Lns and the adjacent lane Lnd.

The state information acquisition unit 75 acquires operation information related to the operation of the driver. Specifically, the state information acquisition unit 75 acquires the steering information described above from the steering ECU 61, as operation information indicating the steering operation. In addition, the state information acquisition unit 75 acquires operation information indicating the operation state (on and off) of the turn signal from the body ECU 63. The state information acquisition unit 75 sequentially provides the acquired steering information and operation information to the display generation unit 76.

The display generation unit 76 controls the presentation of information by the meter display 23 and the HUD 20 to the driver by generating video data sequentially output to the meter display 23 and the HUD 20. The display generation unit 76 draws an original image of each content displayed as a virtual image Vi on each frame image of the video data to be output toward the HUD 20. When drawing the original image of the superimposition content CTs (see FIG. 5 and the like) on the frame image, the display generation unit 76 corrects the drawing position and drawing shape of the original image in the frame image according to the eye point EP and the superimposition target. As a result, the superimposition content CTs is displayed at the position and shape correctly superimposed on the superimposition target when viewed from the eye point EP.

The display generation unit 76 repeats a simulation operation for determining the image formation shape of the virtual image Vi on the image plane IS in order to make the superimposition content CTs follow the superimposition target. The display generation unit 76 reproduces the current traveling environment of the vehicle A in the virtual space based on the navigation information, the locator information, the map data, and the like. The display generation unit 76 sets an object of the subject vehicle at a reference position in the virtual three-dimensional space, and maps a road model with a shape indicated by the high precision map data based on the locator information in association with the subject vehicle object in a three-dimensional space. Further, the display generation unit 76 sets a virtual viewpoint position at a virtual position corresponding to the driver's eye point EP in association with the subject vehicle object. The virtual viewpoint position relative to the subject vehicle object is sequentially corrected based on the latest eye point coordinates acquired by the viewpoint position specifying unit 71.

The display generation unit 76 arranges a virtual object on the road surface of the road model in the three-dimensional space. The virtual object is an object that defines the shape of the superimposition content CTs. The display generation unit 76 refers to the coordinate information of the image plane IS with respect to the vehicle A stored in advance in the storage unit 13 or the like, and defines the image plane IS between the virtual object and the virtual viewpoint position in the virtual space. The display generation unit 76 determines the shape of the virtual object projected onto the image plane IS as the image shape of the virtual image Vi along the virtual line of sight from the virtual viewpoint position toward the virtual object. The display generation unit 76 draws the original image of the superimposition content CTs on the video data taking a magnifying ratio and distortion of the magnifying optical system 22 and the projection range PA into consideration, so that the virtual image Vi of the determined shape is imaged on the image plane IS.

Further, the display generation unit 76 maps the road model using the navigation map data when the high-precision map data cannot be acquired. In this case, the reproducibility and accuracy of the road model reproduced in the three-dimensional space is lower than those when the high-precision map data is used. Further, when the high-precision map data cannot be acquired, the display generation unit 76 can use the detection information of the front camera 31 provided through the driving assistance ECU 50 for mapping the road model together with the navigation map data. Specifically, the detected intersection target and point target, such as the stop line ROc (see FIGS. 4 and 8), the pedestrian crossing lines ROa and ROb (see FIG. 4), the left and right lane markings (FIG. 13, boundary lines ROf), and the roadside edges, are mapped on the road model. Such processing corresponds to a correction processing for correcting the estimated position of the subject vehicle by using the detection information of the front camera 31.

Figure 5:
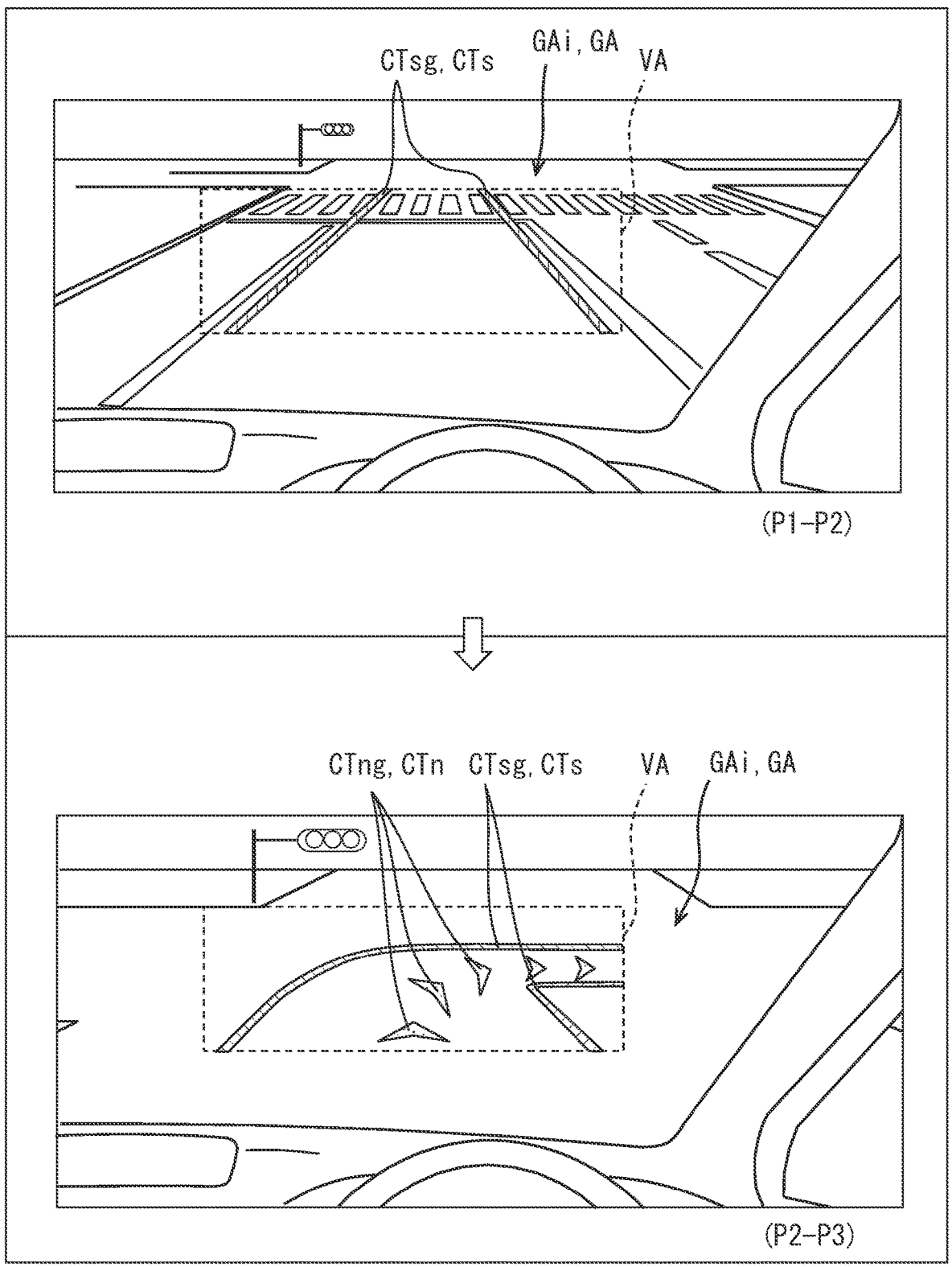
FIG. 5 is a diagram illustrating specific examples of superimposition content and non-superimposition content displayed by the HUD in a route guidance scene shown in FIG. 4.
Figure 6:
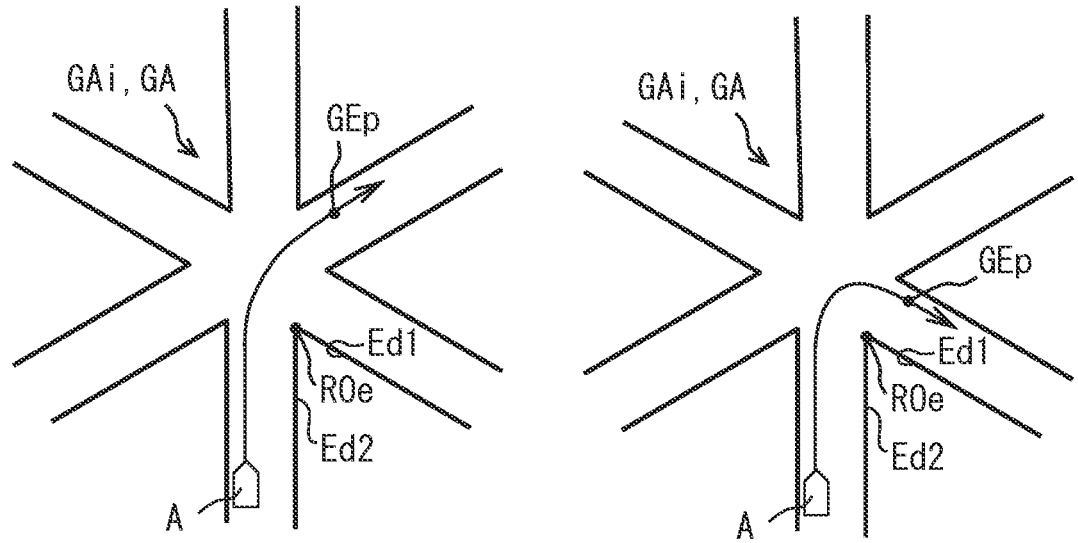
FIG. 6 is a diagram for explaining details of a route guidance at a multi-road junction in a scene of right turn.
Figure 7:
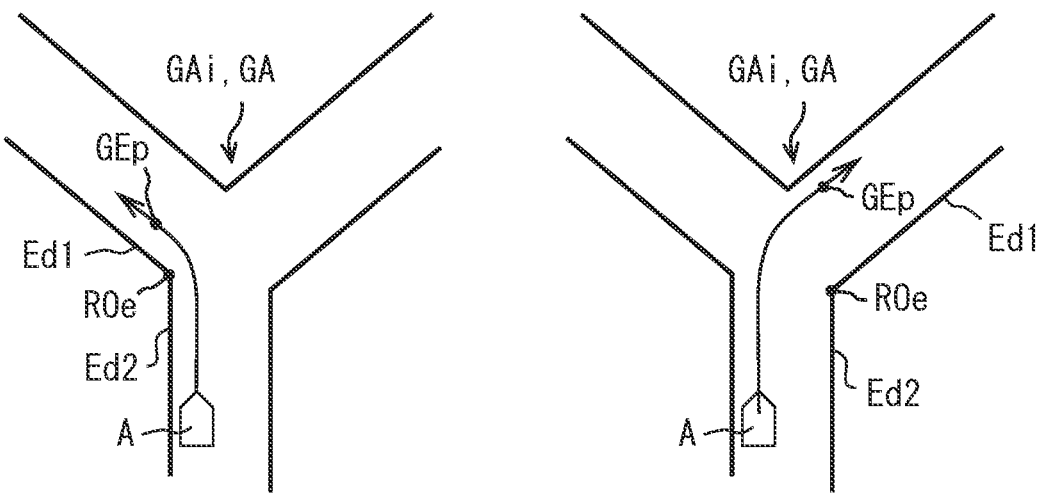
FIG. 7 is a diagram for explaining details of a route guidance at a Y-junction.
Figure 11:
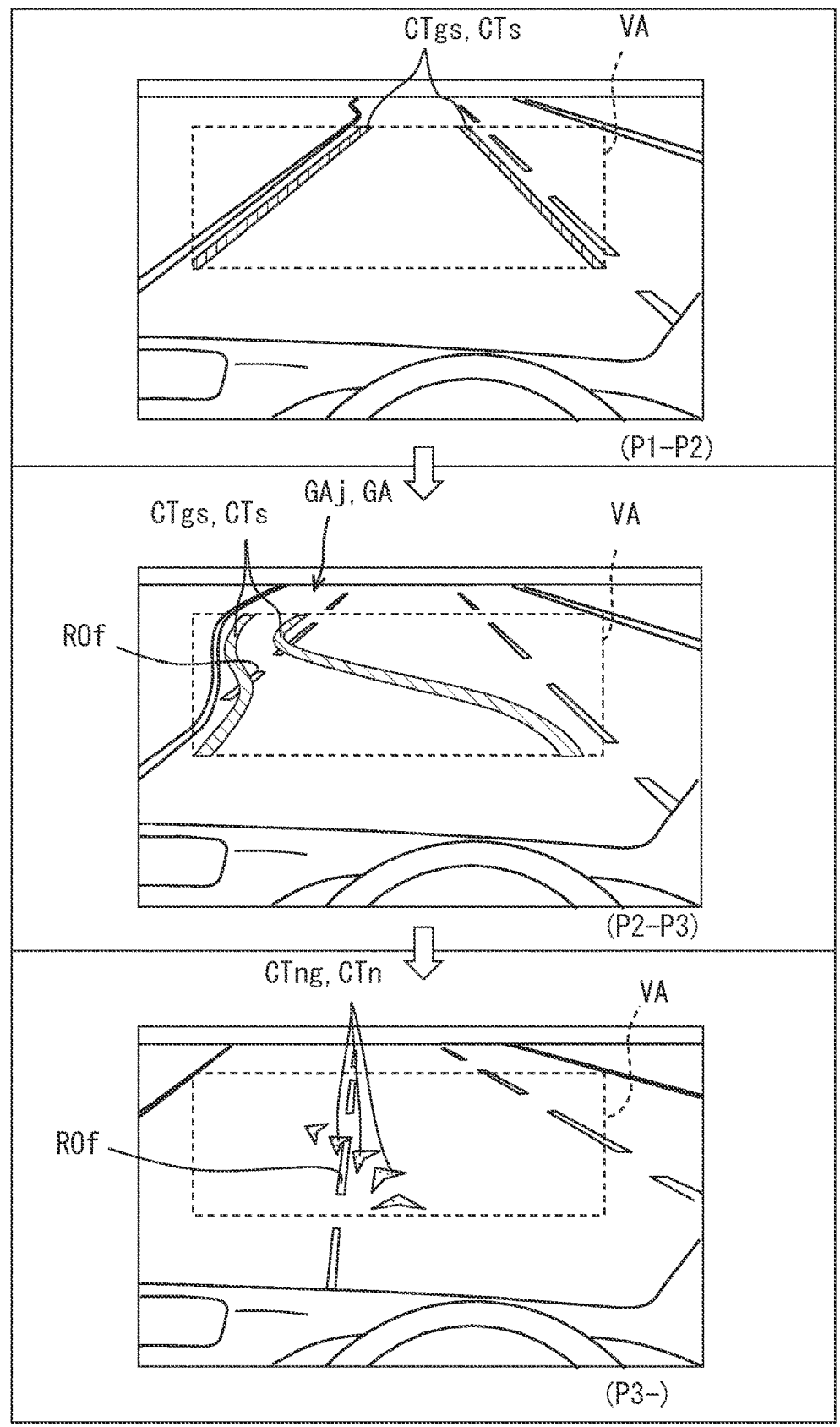
FIG. 11 is a diagram illustrating specific examples of superimposition content and non-superimposition content displayed by the HUD in a route guidance scene shown in FIG. 10.

The display generation unit 76 causes the HUD 20 to display a route guidance content CTsg, a route guidance icon CTng, and the like in the route guidance scene in the guidance area GA (see FIGS. 5 and 11). Further, the display generation unit 76 causes the HUD 20 to display contents such as an LCA content CTlc and an LTC content CTlt in scenes in which the LCA function and the LTC function are in operation (see FIG. 14).

The route guidance content CTsg (see FIGS. 5 and 11) is a superimposition content CTs that provides the route guidance in the guidance area GA. As an example, the route guidance content CTsg has a double line shape, and has the vicinity of each of the left and right lane markings on the road surface of the traveling lane as the superimposition target. The route guidance content CTsg is displayed as if it is attached to the road surface. As having an extending shape like a strip, the route guidance content CTsg notifies a driver of a driving behavior to be selected in the guidance area GA, such as turning left or right, changing lanes, and going straight. In other words, the route guidance content CTsg notifies the driver of the traveling route in the guidance area GA. The route guidance content CTsg is updated with latest drawing shape at a predetermined update cycle so as to match the shape of the road surface viewed from the eye point EP during the traveling of the vehicle A.

A route guidance icon CTng (see FIGS. 5 and 11) is a non-superimposition content CTn and is used for the route guidance in the guidance area GA, in the similar manner to the route guidance content CTsg. The route guidance icon CTng has a predetermined shape and is displayed at a position within a predetermined angle of view VA. As an example, the route guidance icon CTng is displayed as animation display in which a plurality of triangular shapes fly in the traveling direction of the vehicle A. The route guidance icon CTng may be displayed together with the route guidance content CTsg (see FIG. 12), or may be displayed exclusively with the route guidance content CTsg (see FIG. 11).

An LTC content CTlt (see FIG. 14) is a superimposition content CTs indicating the scheduled traveling trajectory of the in-lane traveling in the scene where the in-lane traveling is performed by the LTC function. The LTC content CTlt is displayed based on the status information indicating the execution state of the LTC function. As an example, the LTC content CTlt has a single line shape, and has the road surface of the traveling lane as the superimposition target. The LTC content CTlt is updated with latest drawing shape at a predetermined update cycle so as to match the shape of the road surface of the subject vehicle lane Lns visually recognized in the angle of view VA, based on the boundary recognition information of the subject vehicle lane Lns or the shape information of the scheduled traveling trajectory acquired by the control information acquisition unit 74.

An LCA content CTlc (see FIG. 14) is a superimposition content CTs indicating the moving direction of the lane change in the scene where the lane change is performed by the LCA function. The LCA content CTlc is displayed based on the status information indicating the execution state of the LCA function. As an example, the LCA content CTlc is displayed in such a manner as to fill the road surface of the adjacent lane Lnd (see FIG. 14) to which the vehicle is moved by the automatic lane change. As another example, the LCA content CTlc may be displayed in a band shape indicating the scheduled traveling trajectory PLC (see FIG. 13). The LCA content CTlc is displayed exclusively with the LTC content CTlt. The LCA content CTlc is updated with latest drawing shape at a predetermined update cycle so as to match the shape of the road surface of the adjacent lane Lnd visually recognized in the angle of view VA, based on the boundary recognition information of the adjacent lane Lns or the shape information of the scheduled traveling trajectory PLC acquired by the control information acquisition unit 74.

Next, the details of the display transition of each in-vehicle display device in the scenes of route guidance at the intersection GAi and the branch point GAj and the scene of the automatic lane change by the LCA function will be described based on FIGS. 4 to 14 with reference to FIGS. 1 to 3.

At the intersection GAi and the branch point GAj where the route guidance is performed, the navigation device 55 sets a reference position GP based on the navigation map data. The reference position GP at the intersection GAi is, for example, a central node of the intersection GAi in the navigation map data (see FIG. 4). The reference position GP at the branch point GAj is, for example, the node closest to the terminal ROg of the branch point GAj (see FIG. 10).

<Route Guidance Scene at an Intersection>

Figure 4:
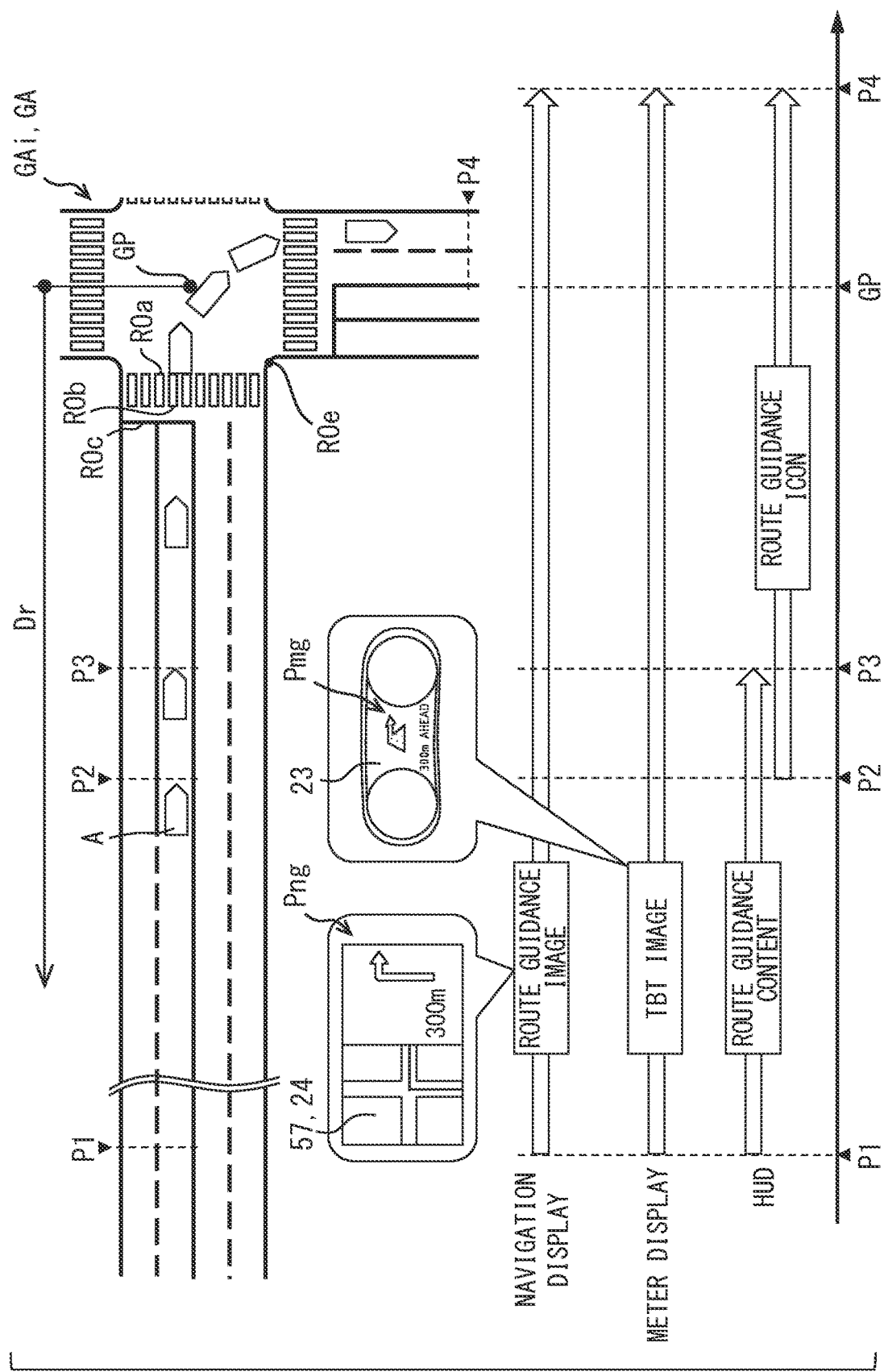
FIG. 4 is a diagram illustrating details of display transitions of a guidance by each in-vehicle display device in a scene of right turn.

In the scene of the right turn at the intersection GAi shown in FIGS. 4 and 5, the navigation device 55 starts the route guidance of the right turn at a position (see point P1) where a remaining distance Dr to the reference position GP is a predetermined distance (for example, about 300 m on a general road). The navigation device 55 starts to display a route guidance image Png on the navigation display 57 at the point P1, and also provides the communication bus 99 with the start notification for notifying the start of the route guidance and the detailed route information indicating the content of the route guidance.

The start notification and the detailed route information output from the navigation device 55 are acquired as navigation information by the navigation information acquisition unit 72 in the HCU 100. Based on such a start notification, the display generation unit 76 causes the meter display 23 to start display of the TBT image Pmg and the HUD 20 to start superimposed display of the route guidance content CTsg. The display generation unit 76 determines the drawing shape of each of the TBT image Pmg and the route guidance content CTsg based on the detailed route information. As described above, the display of the TBT image Pmg and the display of the route guidance content CTsg, which perform the route guidance with substantially the same contents as the route guidance image Png, are started at the timing substantially the same as or slightly delayed from the display start of the route guidance image Png.

As the vehicle A approaches the intersection GAi, the driving assistance ECU 50 generates the intersection target information related to the intersection GAi in the traveling environment recognition unit 51, and outputs the intersection target information to the communication bus 99. The intersection target information output from the driving assistance ECU 50 is acquired as the external information by the control information acquisition unit 74 in the HCU 100.

The display generation unit 76 sets the display start position of the route guidance icon CTng (see point P2) and the display end position of the route guidance content CTsg (see point P3) to positions before, that is, on the near side of the intersection GAi with reference to the intersection target. The point P2 may be farther from the reference position GP of the intersection GAi than the point P3, or may be at the same position as the point P3.

The display generation unit 76 continuously recognizes the position of the subject vehicle (vehicle A) with respect to the intersection GAi based on the locator information and the external information. When the vehicle A reaches the display start position (see point P2), the display generation unit 76 starts to draw an original image of the route guidance icon CTng on the video data. As a result, the HUD 20 is in a state of displaying both the route guidance content CTsg and the route guidance icon CTng as virtual images. When the vehicle A reaches the display end position (see point P3), the display generation unit 76 stops drawing the original image of the route guidance content CTsg on the video data. As a result, the route guidance content CTsg is hidden, and the HUD 20 is in a state of continuing the route guidance only by the route guidance icon CTng. As described above, the display generation unit 76 ends the display of the route guidance content CTsg based on the end determination using the intersection target information (external information) without using the end notification from the navigation device 55.

When the vehicle A that has completed the right turn at the intersection GAi reaches the point P4, the navigation device 55 ends the route guidance. The distance from the reference position GP to the point P4 is, for example, about 30 to 50 m. The point P4 is set, for example, at the position of the first node after passing the intersection GAi. At the point P4, the navigation device 55 ends the display of the route guidance image Png on the navigation display 57, and outputs the end notification for notifying the end of the route guidance to the communication bus 99.

In the HCU 100, the end notification output from the navigation device 55 is acquired as the navigation information by the navigation information acquisition unit 72. Based on such an end notification, at the point P4, the display generation unit 76 causes the meter display 23 to end the display of the TBT image Pmg and the HUD 20 to end the display of the route guidance icon CTng. As described above, the display of the TBT image Pmg and the display of the route guidance icon CTng are ended at substantially the same timing as or slightly delayed from the end of the display of the route guidance image Png.

As described above, the display generation unit 76 sets the conditions for establishing the start determination to start the display of the non-superimposition content CTn and the conditions for establishing the end determination to end the display of the superimposition content CTs. The display generation unit 76 specifies a recognizable intersection target for each intersection GAi, and uses the specified intersection target as a reference to establish the start determination and the end determination described above.

As an example, the display generation unit 76 establishes the start determination and the end determination by using the external information (intersection target information) indicating relative positions of the intersection target, such as a stop line ROc, sidewalk lines ROa and ROb, road signs, traffic lights, information signs, and road structures. As another example, at an intersection GAi in which none of the stop line ROc, the sidewalk line ROa and ROb, the road sign and the like are recognized, the display generation unit 76 establishes the start determination and the end determination by using the node of the intersection GAi or the edge intersection ROe of the road structure as the reference.

The display generation unit 76 can set the conditions of a plurality of patterns using the intersection target, the edge intersection ROe, and the like as the conditions for establishing the end determination. Specifically, the display generation unit 76 can set a fact that the subject vehicle crosses the stop line ROc or the sidewalk lines ROa and ROb as the condition for establishing the end determination (hereinafter, condition 1). Further, the display generation unit 76 can set a fact that the distance to any one of the stop line ROc, the sidewalk line ROa and ROb, the road sign, and the intersection GAi node is less than a threshold value as the condition for establishing the end determination (hereinafter, condition 2). Moreover, the display generation unit 76 can set a fact that the subject vehicle has crossed the stop line ROc or the sidewalk lines ROa and ROb and the steering wheel angle exceeds a predetermined angle as the condition for establishing the end determination (hereinafter, condition 3). In addition, the display generation unit 76 can set a fact that the end position GEp (see FIGS. 6 and 7) set on the exit path from the intersection comes outside of the angle of view VA as the condition for establishing the end determination (hereinafter, condition 4). As an example, the end position GEp is set at or near the position of the node closest to the intersection GAi among the nodes defining the exit route. When setting the condition for establishing the end determination, the display generation unit 76 further sets the condition for establishing the start determination corresponding to the set condition for establishing the end determination.

The display generation unit 76 can change the plurality of conditions for establishing the end determination described above based on the information related to at least one of the intersection GAi and the vehicle A. Specifically, the display generation unit 76 changes the conditions for establishing the end determination according to the shape of the intersection, the presence or absence of the stop line ROc, the direction of turning left or right at the intersection GAi, the superimposition accuracy of the superimposition content CTs, and the like, so as to adjust the superimposition period of the superimposition content CTs.

<Change of Superimposition Period Based on Shape of Intersection Shape>

The display generation unit 76 changes the conditions for establishing the end determination according to the road shape of the intersection GAi which is the guidance area GA. As an example, when the route guidance is performed at a complex intersection (see FIG. 6) such as a 5-road junction or a 6-road junction and a Y-junction (see FIG. 7), the display generation unit 76 changes the conditions for establishing the end determination so that the timing to end the display of the route guidance content CTsg is later than that in the normal route guidance. That is, the display generation unit 76 delays the establishment of the end determination so that the display of the route guidance content CTsg is continued more than that in the normal guidance.

Specifically, when the intersection GAi has a normal shape (e.g., crossroads, T-junction), the display generation unit 76 sets the condition 2 described above as the end condition. On the other hand, when the intersection GAi is a complicated intersection, such as multi-road junction (multi-forked road), the display generation unit 76 sets the condition 1, condition 3 or condition 4 described above as the end condition. Similarly, when the intersection GAi is a Y-junction, the display generation unit 76 sets the condition 1, condition 3 or condition 4 described above as the end condition.

As such, the displaying period of the route guidance content CTsg is longer at the multi-road junction and the Y-junction than at a simple intersection having the normal shape. As a result, it is less likely that the occupant will lose the exit direction after entering the center of the intersection due to the route guidance content CTsg being hidden on a side before the stop line ROc or the entrance of the intersection GAi.

More specifically, when the above condition 4 is set as the end condition at the multi-road junction, the route guidance content CTsg has a shape that extends from the subject vehicle side to the end position GEp (see FIG. 6) so as to stick to the road surface. In the multi-road junction, the end position GEp is set on an exit road from the intersection GAi. Therefore, even if there are multiple directions in which the subject vehicle A can make a right turn (or left turn), the end position GEp can be at the point that can indicate the correct direction to travel among multiple right directions (or left directions). The display of the route guidance content CTsg is continued until the correct exit route comes in the angle of view VA. Therefore it is possible to notify the driver of the traveling direction in an easy-to-understand manner. For example, it is possible to notify the driver whether the subject vehicle is heading to a diagonally right and further side road (see the left view in FIG. 6), or to a right near side road (see the right view in FIG. 6).

Similarly, even when the above condition 4 is set as the end condition at the Y-junction, the route guidance content CTsg has the shape that extends from the subject vehicle side up to the end position GEp (see FIG. 7) set on the exit road from the intersection GAi. Therefore, the route guidance content CTsg can notify the driver of the traveling direction in an easy-to-understand manner until the correct exit road comes in the angle of view VA. For example, the route guidance content CTsg can notify the driver whether the subject vehicle is heading in a diagonally left direction (see the left view in FIG. 7) or in a diagonally right direction (see the right view in FIG. 7) in the Y-junction.

<Change of Superimposition Period Based on Presence or Absence of Stop Line>

The display generation unit 76 changes or adjusts the condition for establishing the end determination based on whether or not there is a stop line ROc (see FIG. 8) which instructs a temporary stop at the entrance on the subject vehicle side of the intersection GAi as the guidance area GAi. Specifically, when there is the stop line ROc before the intersection GAi, the display generation unit 76 changes the condition for establishing the end determination so that the timing to end the display of the route guidance content CTsg is later than that when there is no stop line ROc.

At the intersection GAi with the stop line ROc, the driver temporarily stops the vehicle A before the stop line ROc. Therefore, the route guidance content CTsg is unlikely to interfere with the driver's peripheral confirmation even though the route guidance content CTsg is the superimposition content CTs. As such, at the intersection GAi with the stop line ROc, even if the display period of the route guidance content CTsg is kept longer than that at the intersection GAi without the stop line ROc, the driver is less likely to feel annoyed.

For example, at a simple intersection, such as a T-junction, with no stop line ROc, the display generation unit 76 sets the above condition 2 as the condition for establishing the end determination. On the other hand, at a simple intersection, such as a T-junction, with a stop line ROc on the subject vehicle side (see the left view in FIG. 8), the display generation unit 76 sets the above condition 1 as the condition for establishing the end determination, instead of the above condition 2. As described above, the display generation unit 76 continues the superimposed display of the route guidance content CTsg until after the vehicle A enters the intersection GAi.

Further, at the Y-junction with a stop line ROc (see the right view in FIG. 8), the display generation unit 76 adjusts to increase the predetermined angle of the steering angle set in the condition for establishing the end determination (see the condition 3 above), or to move the end position GEp away from the intersection GAi (see the condition 4 above). As described above, the superimposed display of the route guidance content CTsg is continued at least until after the vehicle A enters the intersection GAi, and will be more difficult to end than that at the Y-junction with no stop line ROc.

<Change of Superimposition Period Based on Direction of Turning Left or Right>

In a situation the subject vehicle A does not cross an oncoming lane when turning left or right at the intersection GAi as the guidance area GA, the display generation unit 76 changes the condition for establishing the end determination so that the timing to end the display of the route guidance content CTsg is later than that when the subject vehicle crosses the oncoming lane. As an example, in a country or region of a left side traffic, the display generation unit 76 changes the condition for establishing the end determination so that the timing to end the display of the route guidance content CTsg is later in the scene of the left turn than in the scene of the right turn.

In this case, in the scene of turning right (see the right view in FIG. 9), the display of the route guidance content CTsg is ended earlier than the vehicle A begins the right turn. Therefore, it is less likely that the visual recognition of an oncoming vehicle traveling on the oncoming lane toward the subject vehicle will be obstructed by the route guidance content CTsg. On the other hand, in the scene of turning left, (see the left view in FIG. 9), the display of the route guidance content CTsg is kept until after the vehicle A begins the left turn. In such a scene of the left turn, there is virtually no overlap between the route guidance content and an oncoming vehicle. In addition, even if the driver observes a pedestrian crossing on the exit route, the route guidance content CTsg is unlikely to interfere with the driver's visual observation of such a pedestrian crossing. Therefore, it is preferable that the display period of the route guidance content CTsg is longer in the scene of the left turn than in the scene of the right turn.

In a country or region of the right side traffic, the display generation unit 76 changes the condition for establishing the end determination so that the timing to end the display of the route guidance content CTsg is later in the scene of the right turn than in the scene of the left turn. By adjusting the timing in this way, it is possible to display the route guidance content CTsg that is unlikely to interfere with the driver's peripheral confirmation.

<Change of Superimposition Period According to Superimposition Accuracy>

The display generation unit 76 changes the condition for establishing the end determination based on whether or not the high-precision map data used for generating the superimposition content CTs can be acquired. At an intersection GAi where the high-precision map data can be acquired, the display generation unit 76 can accurately superimpose and display the route guidance content CTsg as if it were attached to the road surface. On the other hand, at an intersection GAi where high-precision map data cannot be acquired, the route guidance content CTsg tends to shift with respect to the road surface, which in turn tends to be annoying. Therefore, when the high-precision map data can be acquired, the display generation unit 76 delays the establishment of the end determination so that the display of the route guidance content CTsg is continued longer than that when the high-precision map data cannot be acquired. Alternatively, when the high-precision map data cannot be acquired, the display generation unit 76 expedites the establishment of the end determination so that the display period of the route guidance content CTsg is shorter than that when the high-precision map data can be acquired.

In addition, the display generation unit 76 determines whether or not the external information based on the detection information of the front camera 31 includes useful information to be used for generation of the superimposition content CTs (hereinafter referred to as camera recognition information). As described above, the camera recognition information is generated by the traveling environment recognition unit 51 of the driving assistance ECU 50 based on the image data captured by the front camera 31, and is sequentially provided to the control information acquisition unit 74. The camera recognition information is, for example, external information indicating the relative position of the intersection target and the point target.

The display generation unit 76 changes the condition for establishing the end determination based on whether or not the camera recognition information, which can be used for generating the route guidance content CTsg, has been acquired. Specifically, in a case where the display generation unit 76 generates the route guidance content CTsg using the camera recognition information even if the high-precision map data cannot be acquired, the position accuracy of the superimposed display can be improved more than that when the camera recognition information is not used for generating the route guidance content CTsg. Therefore, in the case where the camera recognition information can be acquired, the display generation unit 76 delays the establishment of the end determination so that the display of the route guidance content CTsg is more difficult to end than the case where the camera recognition information cannot be acquired. Alternatively, in the case where the camera recognition information cannot be acquired, the display generation unit 76 expedites the establishment of the end determination, as compared with the case where the camera recognition information can be acquired.

Based on the presence or absence of the high-precision map data and the presence or absence of the camera recognition information of the front camera 31 described above, the display generation unit 76 changes the condition for establishing the end determination in three levels. Specifically, in a case where the display generation unit 76 uses high-precision map data for drawing the route guidance content CTsg, the display generation unit 76 changes the condition for establishing the end determination so that the display of the route guidance content CTsg is continued for the longest period. On the other hand, in a case where the display generation unit 76 uses the navigation map data for drawing the route guidance content CTsg, and the camera recognition information is not acquired, the display generation unit 76 sets the condition for establishing the end determination so that the display of the route guidance content CTsg ends in the shortest period. Further, in a case where the display generation unit 76 uses the navigation map data for drawing the route guidance content CTsg and can correct the superimposed position by using the camera recognition information, the display generation unit 76 sets the condition for establishing the end determination to a middle level. In this case, the display period of the route guidance content CTsg is shorter than the display period when the high-precision map data is used, and longer than the display period when the navigation map data is used without the camera recognition information.

As an example, in a case where the display generation unit 76 draws the route guidance content CTsg using the navigation map data in the absence of the camera recognition information, the display generation unit 76 sets the condition for establishing the end determination to any of the above-described condition. In a case where the display generation unit 76 draws the route guidance content CTsg using the navigation map data in a state of presence of the camera recognition, the display generation unit 76 relaxes a determination value of the condition for establishing the end determination, so that the superimposed display is continued for a long time. In a case where the display generation unit 76 uses the high-precision map data for drawing the superimposition content CTs, the display generation unit 76 does not substantially set the condition for establishing the end determination. In this case, the display generation unit 76 continues the superimposed display of the route guidance content CTsg until the end notification is acquired by the navigation information acquisition unit 72.

<Route Guidance Scene at Branch Point>

Figure 12:
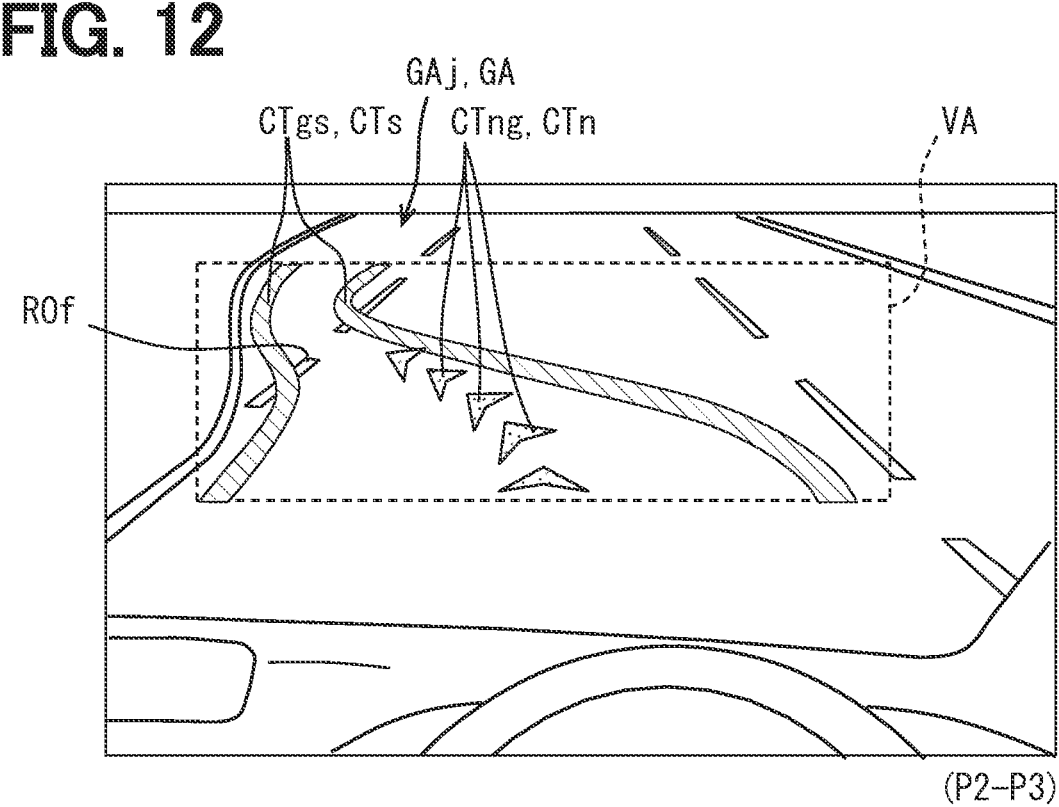
FIG. 12 is a diagram illustrating a modified example of a display transition shown in FIG. 11.

In the scene of the left branch guidance at the branch point GAj shown in FIGS. 10 to 12, the navigation device 55 starts the guidance for the left branch at a position (see point P1) where the remaining distance Dr to the reference position GP is a predetermined distance (for example, about 1000 m on a highway). Also in the scene of the branch guidance, at the point P1, the navigation device 55 starts displaying the route guidance image Png on the navigation display 57, and outputs the start notification and the detailed route information to the HCU 100.

The display generation unit 76 causes the meter display 23 to start the display of the TBT image Pmg and the HUD 20 to start the superimposed display of the route guidance content CTsg, based on the start notification and the detailed route information acquired by the navigation information acquisition unit 72. The TBT image Pmg and the route guidance content CTsg are started to be displayed together with the route guidance image Png, and indicate contents to instruct a lane change into the branch lane Lnj, similarly to the route guidance image Png.

As the vehicle A approaches the branch point GAj, the driving assistance ECU 50 causes the traveling environment recognition unit 51 to generate the point target information related to the branch point GAj, and outputs the point target information generated to the HCU 100. In the HCU 100, the point target information is acquired as the external information by the control information acquisition unit 74. The display generation unit 76 uses the point target as a reference, and sets the display start position of the route guidance icon CTng (see points P2 and P3) and the display end position of the route guidance content CTsg (see points P3 to P6) to positions before the reference position GP.

The points P3 to P6 that can be used as the display end position of the route guidance content CTsg will be described in detail. The point P3 is a position where at least a part of the vehicle A that has started lateral movement to the branch lane Lnj touches the boundary line ROf. The point P4 is a position where the center or the center of gravity of the vehicle A is on the boundary line ROf. The point P5 is a position where the entire vehicle A has finished to cross the boundary line ROf. The point P6 is a position where the blinking of the turn signal is turned off. Further, the display end position may be set to a position before the points P3 to P6 by a predetermined distance (for example, about 30 to 100 m), that is, to a position on a near side to the vehicle A from the points P3 to P6 by the predetermined distance. The point P2 that can be used as the display start position of the route guidance content CTsg is set to a position farther from the reference position GP by a predetermined distance than the point P3.

The display generation unit 76 continuously recognizes the position of the subject vehicle A with respect to the branch point GAj based on the locator information and the external information. When the vehicle A reaches the display end position (see point P3), the display generation unit 76 causes to end the display of the route guidance content CTsg. As described above, the display generation unit 76 causes to end the display of the route guidance content CTsg based on the end determination using the point target information (external information), without using the end notification from the navigation device 55.

The display generation unit 76 sets the display start position (see point P3) of the route guidance icon CTng at the display end position of the route guidance content CTsg. When the vehicle A reaches the display start position, the display generation unit 76 causes to start display of the route guidance icon CTng, in place of the route guidance content CTsg. The display generation unit 76 continues the route guidance by at least displaying the route guidance icon CTng in a period after the display of the route guidance content CTsg is ended.

The display generation unit 76 changes the visibility of the route guidance icon CTng during the display period of the route guidance icon CTng. Specifically, the display generation unit 76 changes the mode to reduce the visibility of the route guidance icon CTng. As an example, the display generation unit 76 changes the route guidance icon CTng from a highly visible route guidance icon CTng (hereinafter, first route guidance icon) to a less visible route guidance icon CTng (hereinafter, second route guidance icon). The mode change to reduce the visibility is realized by, for example, reducing the display size, lowering the display brightness or the display saturation, suppressing or canceling the effect of animation or the like. The display generation unit 76 executes a display transition from the first route guidance icon to the second route guidance icon, for example, at a point before the reference position GP (for example, point P6).

The display generation unit 76 can appropriately change the execution point of the display transition to reduce the visibility. As an example, the display generation unit 76 may change the mode so that the visibility of the route guidance icon CTng is continuously lowered. As another example, the display of the route guidance icon CTng (first route guidance icon) may be started from the point P2. In this case, the route guidance content CTsg and the route guidance icon CTng are both displayed in the period from the point P2 to the point P3 (see FIG. 12).

When the vehicle A that has completed the lane change to the branch lane Lnj passes the reference position GP and reaches the point P7, the navigation device 55 ends the route guidance. The distance from the reference position GP to the point P7 is, for example, about 30 to 100 m. The point P7 is set, for example, at a position of the first node after passing the reference position GP. At the point P7, the navigation device 55 ends the display of the route guidance image Png on the navigation display 57, and outputs an end notification for notifying the end of the route guidance to the HCU 100.

The display generation unit 76 causes the meter display 23 to end the display of the TBT image Pmg as well as the HUD 20 to end the display of the route guidance icon CTng at the point P7 based on the end notification acquired as the navigation information by the navigation information acquisition unit 72. As a result, the display of the TBT image Pmg and the display of the route guidance icon CTng (second route guidance icon) are also ended in accordance with the end of the display of the route guidance image Png.

As described above, the display generation unit 76 also sets the conditions for establishing the display start determination of the non-superimposition content CTn and the conditions for establishing the display end determination of the superimposition content CTs even at the branch point GAj. Then, the display generation unit 76 establishes the start determination and the end determination by using the external information (point target information) indicating the relative position of the boundary line ROf or the end ROg as the point target.

Specifically, the display generation unit 76 can set a fact that the subject vehicle A crosses the boundary line ROf of the branch lane Lnj as the condition for establishing the end determination (see points P3 and P4, hereinafter, condition 5). The display generation unit 76 can set a fact that the subject vehicle A finished to cross the boundary line ROf of the branch lane Lnj as the condition for establishing the end determination (see point P5, hereinafter, condition 6). The display generation unit 76 can set a fact that the turn signal indicator is turned off as the condition for establishing the end determination (see point P6, hereinafter, condition 7). The display generation unit 76 predicts the positions of the points P3 to P6, and can set a fact that the subject vehicle A reaches a position that is a predetermined distance before the points P3 to P6 as the conditions for establishing the end determination (hereinafter, condition 8). Even at the branch point GAj, the conditions for establishing the start determination may be appropriately set according to the conditions for establishing the end determination.

<Scene of Changing Lanes>

Figure 13:
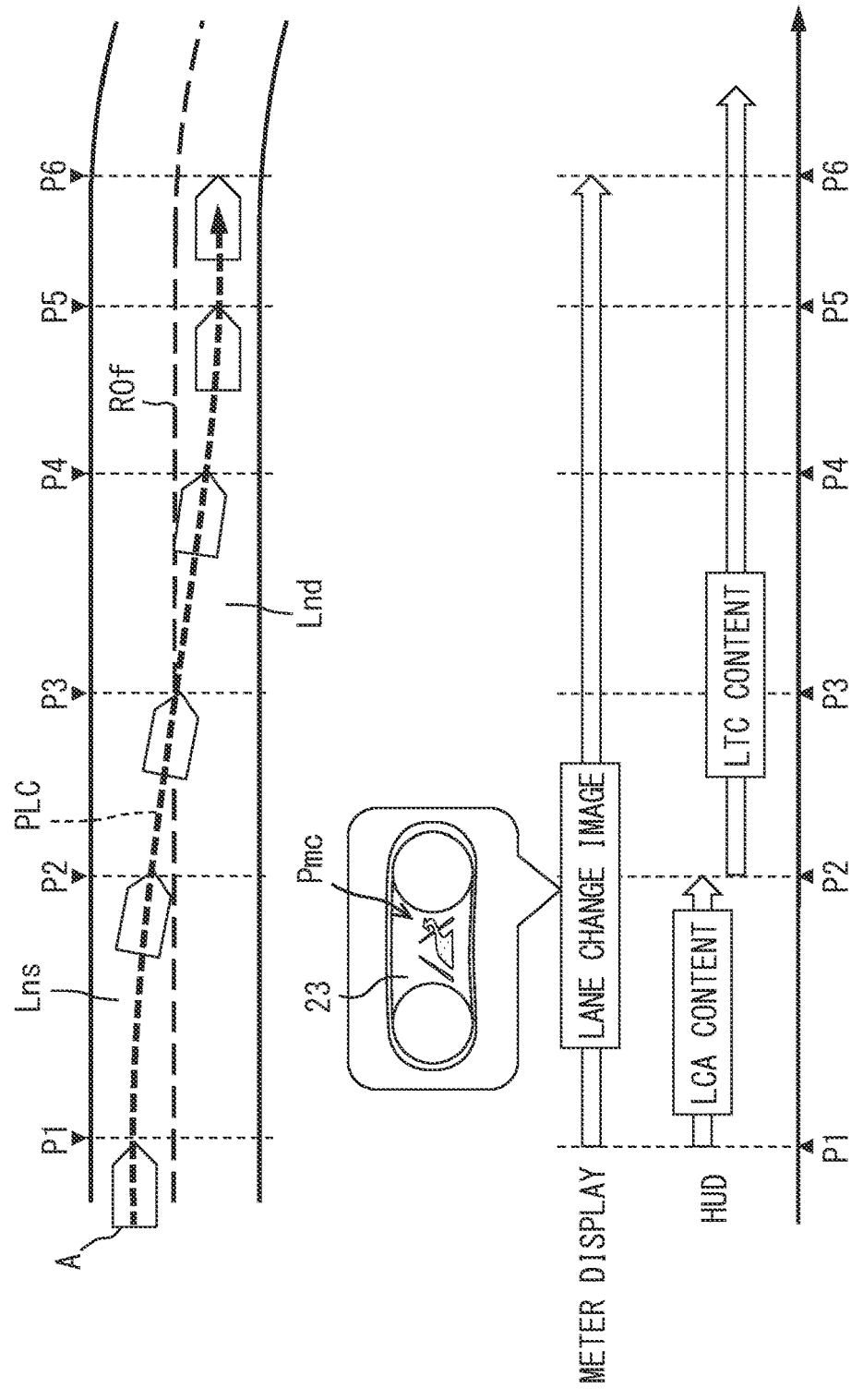
FIG. 13 is a diagram illustrating details of display transitions of a guidance by each in-vehicle display device in a scene of automatic lane change.
Figure 14:
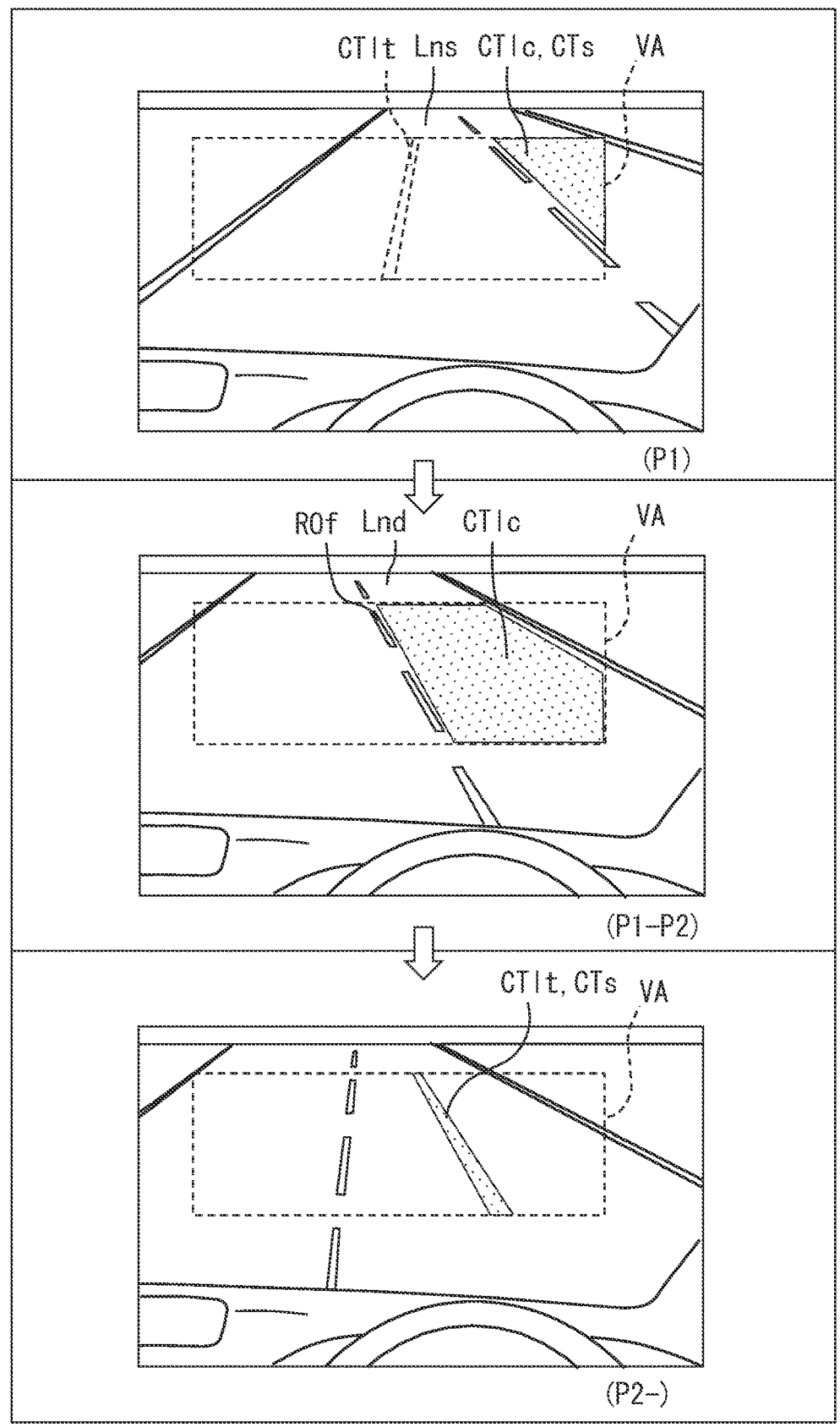
FIG. 14 is a diagram illustrating a specific example of superimposition content displayed by the HUD in the scene of automatic lane change shown in FIG. 13.

In a scene of an automatic lane change shown in FIGS. 13 and 14, the HCU 100 recognizes the timing at which the LCA function shifts to the execution state (see point P1) based on the status information of the LCA function acquired by the control information acquisition unit 74. The HCU 100 may recognize the timing at which the LCA function transitions from the off state to the activated state, instead of the timing to shift to the execution state of the LCA function.

The display generation unit 76 causes the meter display 23 to start the display of the lane change image Pmc and the HUD 20 to start the superimposed display of the LCA content CTlc, based on the status information indicating the execution state of the LCA function. The lane change image Pmc and the LCA content CTlc are contents indicating the moving direction of the vehicle A in the lane change.

In the HCU 100, the control information acquisition unit 74 acquires the external information indicating the relative position of the boundary line ROf between the subject vehicle lane Lns and the adjacent lane Lnd. The display generation unit 76 uses the external information about the boundary line ROf to set the display transition position (see points P2 to P6) for transitioning the superimposition content CTs from the LCA content CTlc to the LTC content CTlt.

To describe in detail the points P2 to P6 that can be used as the display transition positions, the point P2 is a position where at least a part of the vehicle A that has started lateral movement to the adjacent lane Lnd touches the boundary line ROf. The point P3 is a position where the center or the center of gravity of the vehicle A is on the boundary line ROf. The point P4 is a position where the entirety of the vehicle A has finished to cross the boundary line ROf. The point P5 is a position where the driving control transitions from the LCA function to the LTC function. The point P6 is a position where the blinking of the turn signal indicator is turned off. The display generation unit 76 set any one of these points P2 to P6 as the display transition position. In the example of FIG. 13, the point P2 is set as the display transition position.

As described above, the display generation unit 76 recognizes the position of the vehicle A with respect to the boundary line ROf based on the external information, and causes to end the display of the LCA content CTlc based on the end determination using at least the external information. Further, the display generation unit 76 causes the meter display 23 to continue the display of the lane change image Pmc until the blinking of the turn signal indicator is turned off. Therefore, in the case where the display transition position is set to any of the points P2 to P5, the display generation unit 76 causes to end the display of the LCA content CTlc, earlier than the ending of the display of the lane change image Pmc, based on the end determination using at least the external information.

Next, the details of the display control method for realizing the route guidance and the lane change guidance described so far, particularly the contents related to the display of the superimposition content CTs, will be described based on the flowcharts shown in FIGS. 15 to 17 with reference to FIG. 1 and FIGS. 4 to 14.

Figure 15:
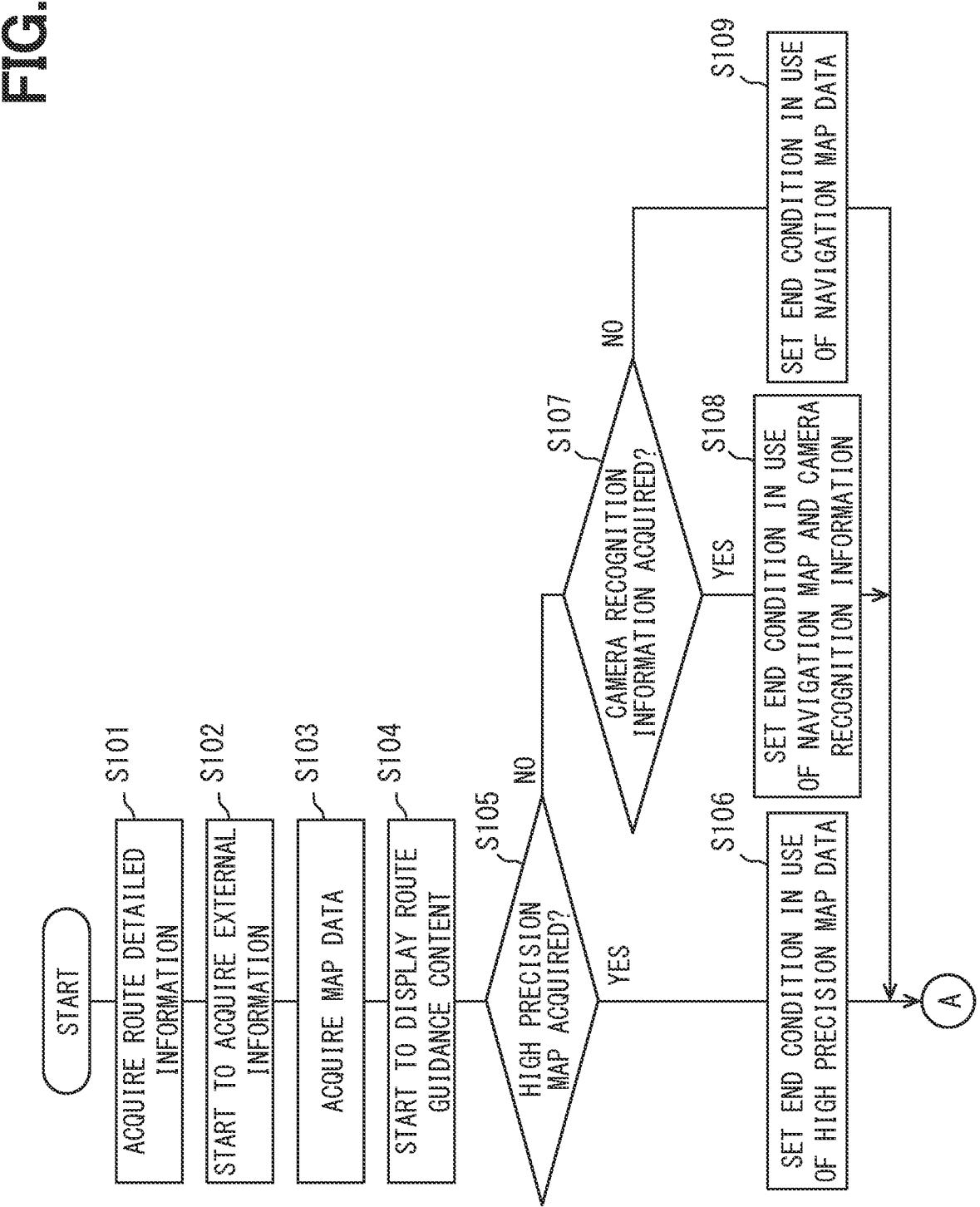
FIG. 15 is a flowchart illustrating details of a display control processing related to a route guidance according to the first embodiment, together with FIG. 16.
Figure 16:
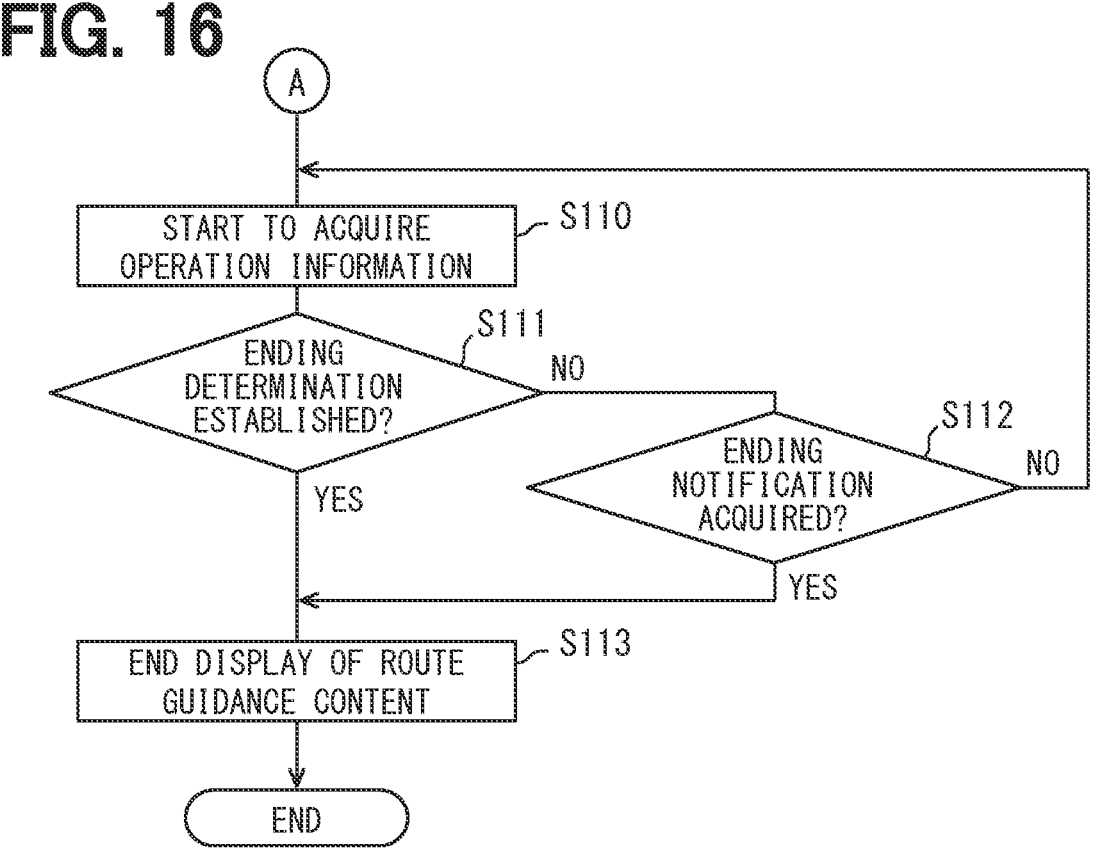
FIG. 16 is a flowchart illustrating details of the display control processing together with FIG. 15.

The HCU 100 starts a display control processing shown in FIGS. 15 and 16, in response to receiving the start notification from the navigation device 55. In S101 of the display control processing shown in FIG. 15, the detailed route information and the like necessary for displaying the TBT image Pmg, the route guidance content CTsg, and the like are acquired, and the process proceeds to S102. In S102, acquisition of the external information necessary for drawing the route guidance content CTsg, in other words, acquisition of the external information used for a simulation calculation of the display layout of the superimposition content CTs, is started, and the process proceeds to S103.

In S103, the map data used for the simulation calculation of the display layout of the superimposition content CTs is acquired, and the process proceeds to S104. In S103, the priority is given to the acquisition of the high-precision map data from the locator 40. When there is no high-precision map data of the guidance area GA, the navigation map data of the guidance area GA is acquired from the navigation device 55.

In S104, the information acquired in S101 to S103 is used to start the display of the route guidance content CTsg by HUD20, and the process proceeds to S105. In S104, the display of the TBT image Pmg on the meter display 23 is also started together with the route guidance content CTsg.

In S105, it is determined whether or not the high-precision map data used for generating the route guidance content CTsg has been acquired. When it is determined in S105 that the high-precision map data has been acquired, the process proceeds to S106. On the other hand, when it is determined in S105 that the high-precision map data has not been acquired, the process proceeds to S107.

In S107, it is determined whether or not the camera recognition information used for generating the route guidance content CTsg has been acquired. When it is determined in S107 that the camera recognition information has been acquired, the process proceeds to S108. On the other hand, when it is determined in S107 that the camera recognition information has not been acquired, the process proceeds to S109.

In S106, the condition for establishing the end determination when using the high-precision map data is set, and the process proceeds to S110. On the other hand, in S108, the condition for establishing the end determination when the navigation map data is used in the state where the camera recognition information is present is set, and the process proceeds to S110. Further, in S109, the condition for establishing the end determination when the navigation map data is used in the absence of camera recognition information is set, and the process proceeds to S110.

As described above, when the superimposition content CTs is generated using the high-precision map data, the condition for establishing the end determination is changed (moderated) so that the display is more difficult to end than when the superimposition content CTs is generated using the navigation map data. In addition, when the camera recognition information is present, the condition for establishing the end determination is changed (moderated) so that the display is more difficult to end than when there is no camera recognition information. Further, in S106, S108 and S109, the conditions for establishing the end determination are changed according to the road shape of the guidance area GA, the presence or absence of the stop line ROc, the direction of turning left or right, and the like.

In S106, it may not be necessary to set the condition for the end determination. In this case, as will be described later, the display of the route guidance content CTsg is ended based on the failure of the condition for the end determination (S111: NO) and the acquisition of the ending notification (S112: YES).

In S110 shown in FIG. 16, acquisition of operation information, such as steering information including information of the steering wheel angle or the like is started, and the process proceeds to S111. When the operation information is not used in the condition for establishing the end determination set in S106, S108, or S109, S110 may be skipped.

In S111, by using at least the external information, it is determined whether or not the end condition set in S106, S108 or S109 is satisfied. When it is determined in S111 that the end condition is satisfied, the process proceeds to S113. On the other hand, if it is determined in S111 that the end determination is not established, the process proceeds to S112.

In S112, it is determined whether or not the end notification has been acquired from the navigation device 55. When it is determined in S112 that the end notification has not been acquired, the process returns to S110. As a result, the display of the route guidance content CTsg is continued. On the other hand, when it is determined in S112 that the end notification has been acquired, the process proceeds to S113.

In S113, the display of the route guidance content CTsg is terminated based on the establishment of the end determination of S111 or the acquisition of the end notification of S112, and the display control process related to the route guidance is terminated. When the end determination is established in S111, the display of the route guidance content CTsg is terminated without waiting for the reception of the end notification from the navigation device 55. Even after the display of the route guidance content CTsg is completed, the display of the route guidance icon CTng and the display of the TBT image Pmg are continued.

Figure 17:
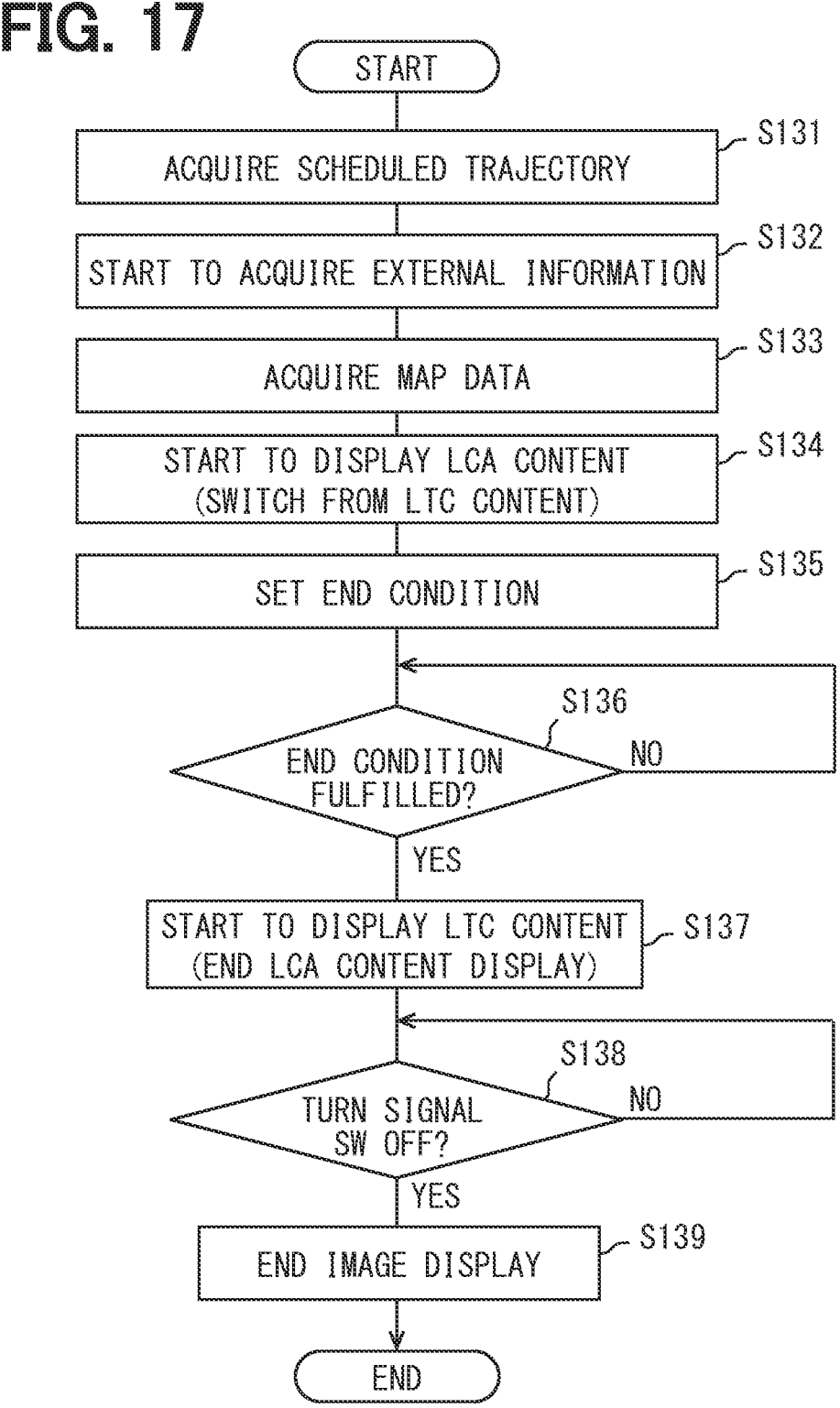
FIG. 17 is a flowchart illustrating details of a display control processing relating to a guidance for a manual lane change.

The HCU 100 starts the display control processing shown in FIG. 17, for example, in response to receiving the status information for notifying the transition of the LCA function to the execution state. In S131 of the display control processing shown in FIG. 17, the shape information of the scheduled traveling trajectory PLC of the scheduled lane change is acquired, and the process proceeds to S132. In S132, acquisition of the external information necessary for drawing the LCA content CTIc is started, and the process proceeds to S133. In S133, the map data of the road section including the entire scheduled traveling trajectory PLC is acquired, and the process proceeds to S134. Also in S133, in the similar manner to S103, the priority is given to the acquisition of high-precision map data from the locator 40.

In S134, the information acquired in S131 to S133 is used to start the display of the LCA content CTIc by the HUD 20, and the process proceeds to S135. In S134, the superimposed display is switched from the LTC content CTIt to the LCA content CTIc. Further, in S134, the display of the lane change image Pmc by the meter display 23 is started together with the LCA content CTIc.

In S135, the condition for establishing the end determination for ending the display of the LCA content CTIc is set, and the process proceeds to S136. In S136, it is determined whether or not the end condition set in S135 is fulfilled by using at least the external information. When it is determined in S136 that the end condition is fulfilled, the process proceeds to S137. On the other hand, when it is determined in S136 that the end determination has not been fulfilled, S136 is repeated to wait for the establishment of the end determination.

In S137, the display of the LCA content CTIc is ended, and the display of the LTC content CTIt is started. Then, the process proceeds to S138. In S138, it is determined whether or not the blinking of the turn signal indicator is turned off, in other words, whether or not a series of lane change has been completed. When it is determined in S138 that the turn signal indicator is turned off, the process proceeds to S139. In S139, the display of the lane change image Pmc by the meter display 23 is ended, and the display control processing is ended. As described above, based on the end determination of S136 using at least the external information, the display of the LCA content CTIc is ended earlier than the end of the display of the lane change image Pmc.

According to the first embodiment described so far, by implementing the end determination using at least the external information around the vehicle A, the display of the route guidance content CTsg can be ended at an appropriate timing independently from the end timing of the route guidance by the navigation device 55. Based on the above, it is less likely that the route guidance content CTsg will continue to be displayed in a conspicuous position even though the vehicle A has finished turning left or right. Therefore, even if the superimposition content CTs is used, it is possible to present information that does not give a sense of discomfort to an occupant such as a driver.

In addition, in the first embodiment, by implementing the end determination using at least the external information around the vehicle A, the display of the route guidance content CTsg is ended appropriately at a timing earlier than the end of the display of the route guidance image Png. According to the above, even if the superimposition content CTs is used, it is possible to present information that does not give a sense of discomfort to the occupant such as the driver.

Further, in the first embodiment, when the intersection GAi is set as the guidance area GA, the intersection target information related to the intersection GAi is acquired as the external information. Then, the display generation unit 76 causes to end the display of the route guidance content CTsg based on the end determination using the intersection target information. As described above, according to the use of the intersection target recognized by the traveling environment recognition unit 51, the display generation unit 76 can further optimize the display end timing of the route guidance content CTsg according to the intersection GAi in which the subject vehicle A travels.

In the first embodiment, in the case where the intersection GAi as the guidance area GA is a preset complicated intersection, the display generation unit 76 changes the condition for establishing the end determination so that the timing to end the display of the route guidance content CTsg is later than that in the case where the intersection is not a complicated intersection. Therefore, the route guidance content CTsg can be superimposed on the road surface of the correct exit route from the intersection GAi. As a result, the route guidance content CTsg can provide a route guidance that is easy for the driver to understand.

In the first embodiment, when there is the stop line ROc before the intersection GAi as the guidance area GA, the display generation unit 76 changes the condition for establishing the end determination so that the timing to end the display of the route guidance content CTsg is later than that when there is no stop line ROc. Therefore, in a scene where the route guidance content CTsg is unlikely to be in the way due to the temporary stop of the vehicle A, the display period of the route guidance content CTsg is secured. As a result, route guidance that is easy for the driver to understand is implemented.

In the first embodiment, in the case where the subject vehicle A does not cross the oncoming lane when turning right or left at the intersection GAi as the guidance area GA, the display generation unit 76 changes the condition for establishing the end determination so that the timing to end the display of the route guidance content CTsg is later than that in the case where the subject vehicle A crosses the oncoming lane. Based on the above, it is unlikely that the route guidance content CTsg obstructs the visibility of an oncoming vehicle in the scene of turning right. Further, in the scene of turning left in which confirmation of an oncoming vehicle is not required, since the display period of the route guidance content CTsg is secured, the route guidance that is easy for the driver to understand is implemented.

In the first embodiment, when the branch point GAj is set as the guidance area GA, the point target information related to the branch point GAj is acquired as the external information. Then, the display generation unit 76 ends the display of the route guidance content CTsg based on the end determination using the point target information. As described above, by using the point target recognized by the traveling environment recognition unit 51, the display generation unit 76 further optimizes the display end timing of the route guidance content CTsg depending on the branch point GAj on which the subject vehicle is traveling. In addition to the branch point GAi, the display generation unit 76 can optimize the display end timing of the route guidance content CTsg even at the merging point based on the end determination using the point target information.

In addition, the control information acquisition unit 74 of the first embodiment can acquire the position information of the edge intersection ROe obtained by detecting the edge of the road in the guidance area GA as the external information. Then, the display generation unit 76 uses the position information of the edge intersection ROe for the end determination, and causes to end the route guidance content CTsg based on the end determination. Based on the detection process derived from the road structure such as edge detection, the display generation unit 76 can cause to appropriately end the display of the route guidance content CTsg even in the guidance area GA in which a specific target such as a road surface sign and a road sign does not exist.

Further, the display generation unit 76 of the first embodiment can change the condition for the end determination according to the road shape of the guidance area GA. Therefore, the display generation unit 76 can reduce the sense of incongruity while utilizing the advantages of the superimposition content CTs as needed.

Further, in the first embodiment, the route guidance icon CTng is displayed as the non-superimposition content CTn to continue the route guidance in the period after the display of the route guidance content is ended. Then, the display generation unit 76 changes the mode of the route guidance icon CTng to lower the visibility during the display period of the route guidance icon CTng. Therefore, the annoyance of the display is reduced by the process of lowering the visibility of the route guidance icon CTng while realizing the easy-to-understand route guidance by displaying the route guidance icon CTng.

In the first embodiment, the display of the LCA content CTIc indicating the moving direction in the lane change can be ended at an appropriate timing by performing the end determination using at least the external information around the vehicle A. Based on the above, it is less likely that the LCA content CTIc will continue to be displayed in a conspicuous position even though the lane change of the vehicle A has been completed. Therefore, even if the superimposition content CTs is used, it is possible to present information that does not give a sense of discomfort to the occupant such as the driver.

Further, in the first embodiment, in the scene of the automatic lane change by the LCA function, the display generation unit 76 causes to end the display of the LCA content CTIc earlier than the end of the display of the lane change image Pmc by the meter display 23, based on the end determination using the external information. As described above, if the state of the LCA function can be confirmed visually by the meter display 23, the display end timing of the LCA content CTIc can be appropriately advanced so as not to give a sense of discomfort to the occupant.

In the first embodiment, the navigation map data and the high-precision map data having different accuracy are acquired as the map data used for generating the superimposition content CTs. Then, the display generation unit 76 can change the condition for the end determination based on whether or not the high-precision map data can be acquired. Based on the above, the display generation unit 76 can optimize the display end timing of the superimposition content CTs according to the accuracy of the map data.

Specifically, when drawing the superimposition content CTs using the high-precision map data, the display generation unit 76 moderates the condition for the end determination so that it is more difficult to end the display of the superimposition content CTs than when drawing the superimposition content CTs using the navigation map data. In other words, the display generation unit 76 can end the display of the superimposition content CTs at an early stage, when the superimposition content CTs cannot be accurately superimposed on the road surface. Therefore, in a situation where the occupant is likely to feel annoyance of the superimposition content CTs due to the accuracy of the map data, the display generation unit 76 can appropriately stop the display of the superimposition content CTs.

In addition, when the camera recognition information based on the image data by the front camera 31 is used to generate the display contents, the display generation unit 76 of the first embodiment makes the display of the route guidance content CTsg more difficult to end than when the camera recognition information is not used to generate the display contents. According to such a change of the condition for establishing the end determination, in the case where the superimposition accuracy of the route guidance content CTsg is ensured, the display period of the route guidance content CTsg can be easily secured. As a result, the route guidance that is easy for the driver to understand can be realized.

In the first embodiment, in addition to the external information, the operation information (e.g., steering information and the like) related to the driver's operation is used for the end determination. Therefore, even after the vehicle A has moved to a position at which the target such as the stop line ROc or the sidewalk lines ROa and ROb is outside the angle of view of the front camera 31, the display generation unit 76 can cause to end the display of the route guidance content CTsg. As described above, by using the operation information for the end determination, the degree of freedom in setting the display end timing can be further improved.

In the first embodiment, the meter display 23 corresponds to a "screen display" and the front camera 31 corresponds to an "in-vehicle camera". Further, the control information acquisition unit 74 corresponds to an "external information acquisition unit", the state information acquisition unit 75 corresponds to an "operation information acquisition unit", the display generation unit 76 corresponds to a "display control unit", and the HCU 100 corresponds to a "display control device". The route guidance content CTsg and the LCA content CTlc correspond to the "superimposition content", the route guidance icon CTng corresponds to the "non-superimposition content", and the navigation map data corresponds to a "low-precision map data". The LCA function corresponds to a "lane change function", the relative position information of the edge intersection ROe corresponds to an "edge position information", and the stop line ROc corresponds to a "stop line" or "barrier line".

Second Embodiment

A second embodiment of the present disclosure illustrated in FIGS. 18 to 22 is a modification of the first embodiment. In the second embodiment, the configuration of the HMI system 210 is different from that of the first embodiment. The HMI system 210 has a function corresponding to the navigation device 55 (see FIG. 1) of the first embodiment, and includes a navigation display 24 and a navigation map DB 25. The navigation display 24 and the navigation map DB 25 have substantially the same configurations as the navigation display 57 and the navigation map DB 56 (see FIG. 1) of the first embodiment.

Figure 18:
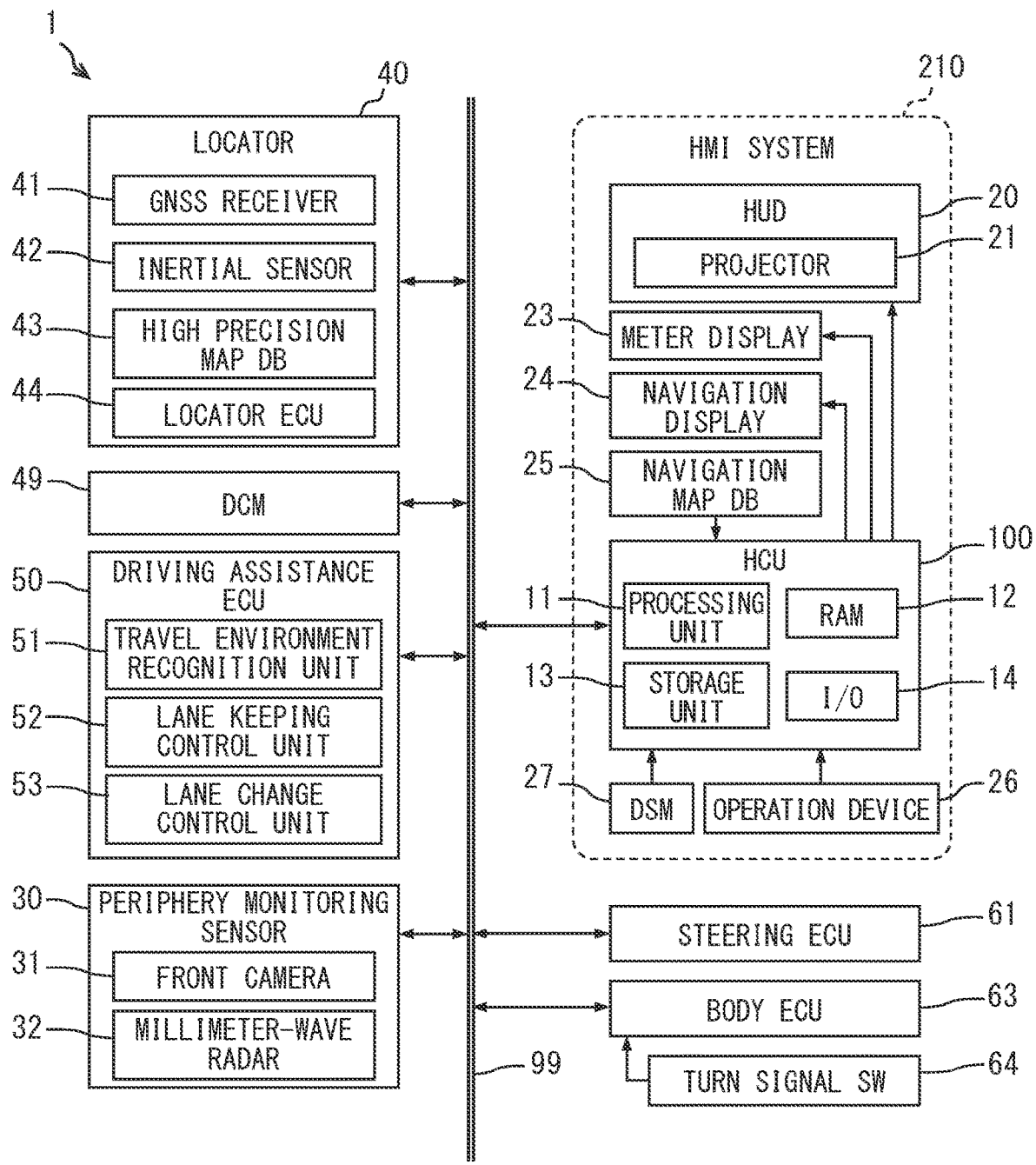
FIG. 18 is a diagram illustrating an overview of an in-vehicle network according to a second embodiment of the present disclosure.
Figure 19:
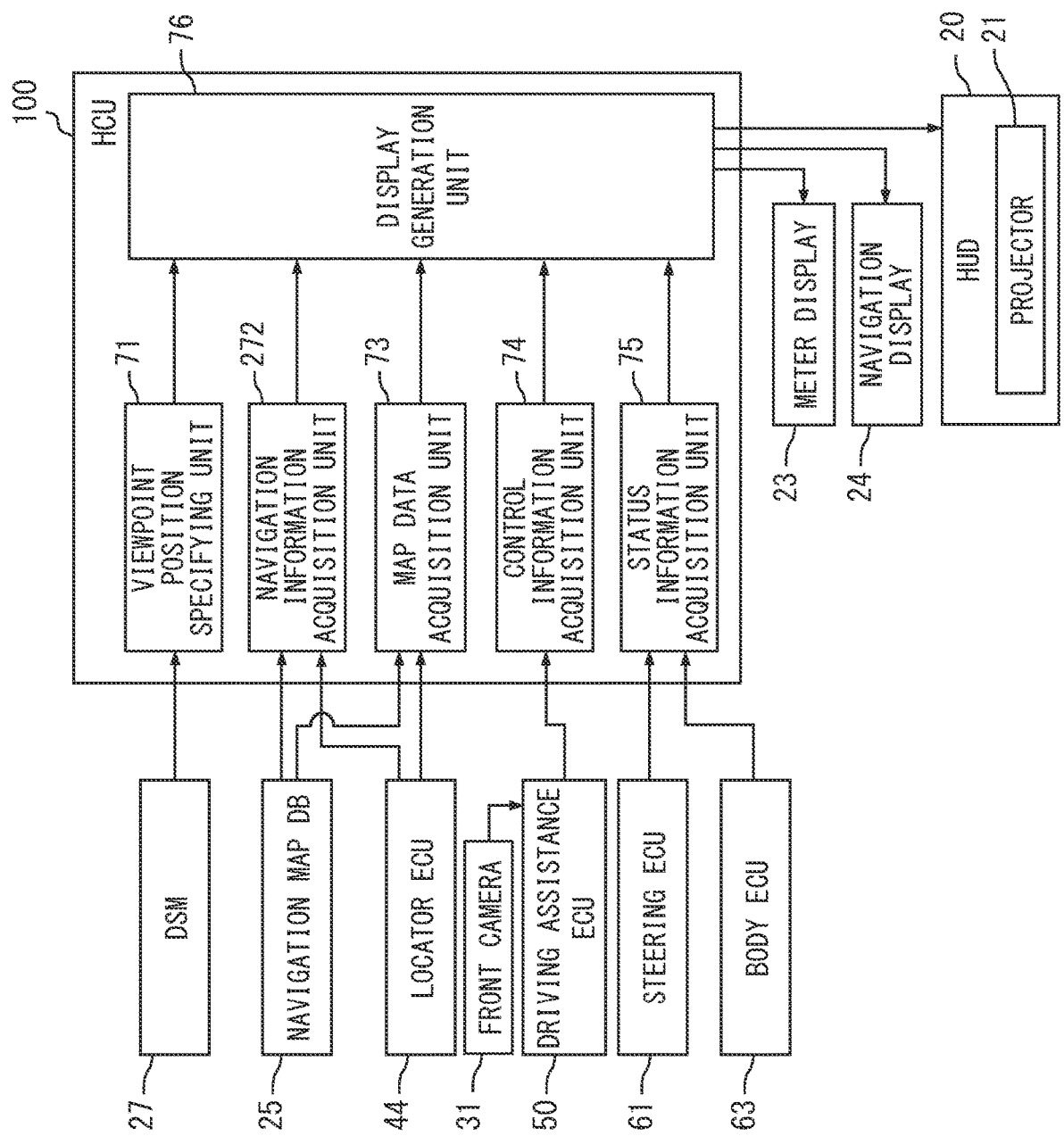
FIG. 19 is a diagram illustrating an example of a schematic configuration of an HCU according to a second embodiment of the present disclosure.

Similar to the first embodiment, the HCU 100 shown in FIGS. 18 and 19 provides the route guidance at the intersection GAi and the branch point GAj (see FIGS. 4 to 12) and the guidance for an automatic lane change (see FIGS. 13 and 14). The HCU 100 includes a navigation information generation unit 272 as a functional unit, in addition to the viewpoint position specifying unit 71, the map data acquisition unit 73, the control information acquisition unit 74, the state information acquisition unit 75, and the display generation unit 76.

The navigation information generation unit 272 sets a destination based on the user's operation and a route to the destination, by using the navigation map data acquired from the navigation map DB 25 and the locator information acquired from the locator ECU 44. The navigation information generation unit 272 executes route guidance according to the set route. The display generation unit 76 generates video data sequentially output to the navigation display 24 in addition to the HUD 20 and the meter display 23, and controls the presentation of information to the driver by the navigation display 24. The navigation information generation unit 272 and the display generation unit 76 cause the navigation display 24 to guide the traveling direction of the vehicle A in the guidance area GA by the route guidance image Png (see FIG. 4 and the like) as the subject vehicle A approaches the guidance area GA (see FIG. 4 and the like) included in the set route.

The navigation information generation unit 272 recognizes the remaining distance Dr to the reference position GP of the guidance area GA included in the set route based on the locator information. The navigation information generation unit 272 causes the HCU 100 to start the display control processing shown in FIGS. 20 and 21 at a timing when the remaining distance Dr is less than the predetermined distance. The predetermined distance is about 300 m on a general road and about 1000 m on an expressway, as in the first embodiment.

Figure 20:
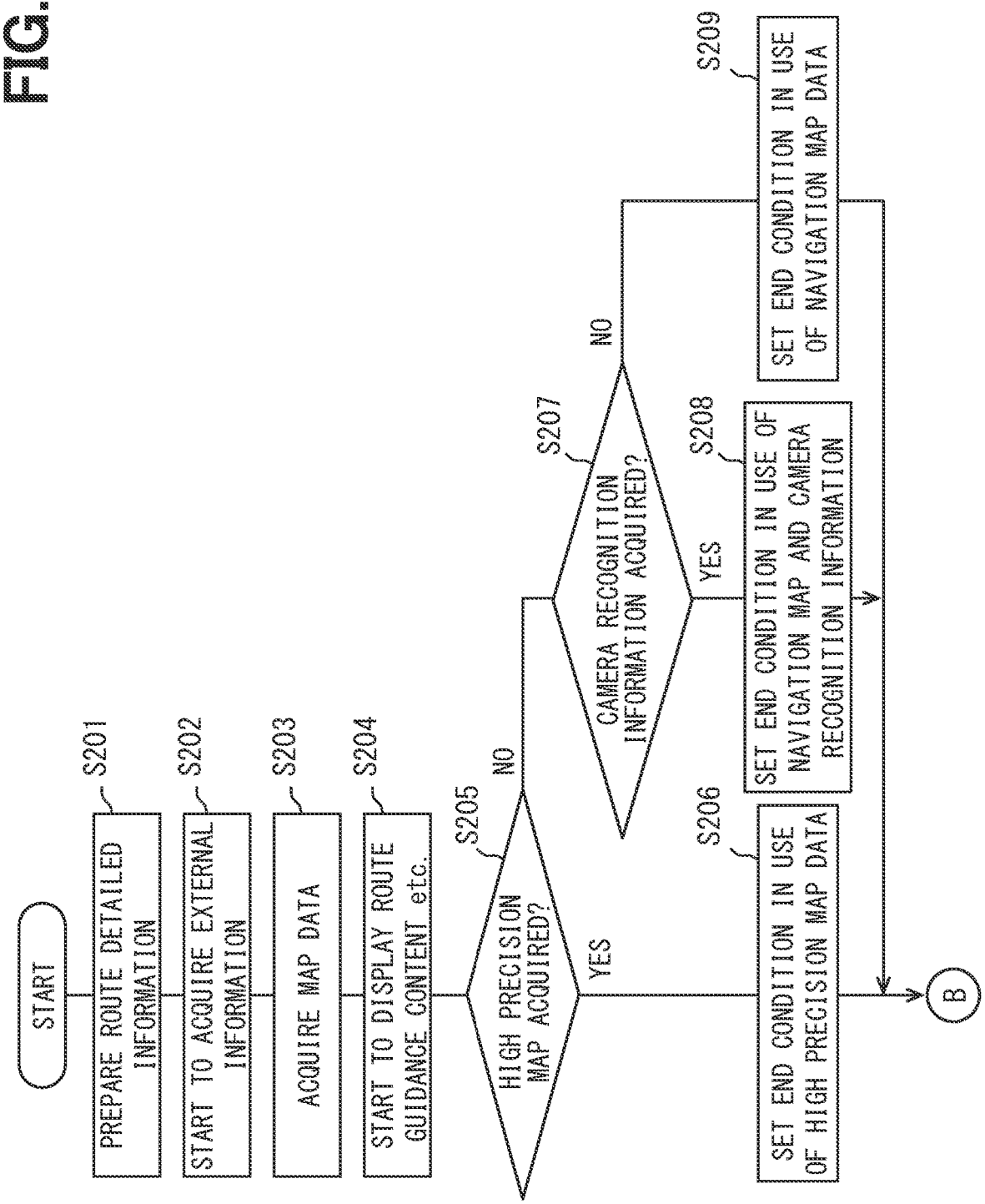
FIG. 20 is a flowchart illustrating details of a display control processing related to a route guidance according to the second embodiment, together with FIG. 21.
Figure 21:
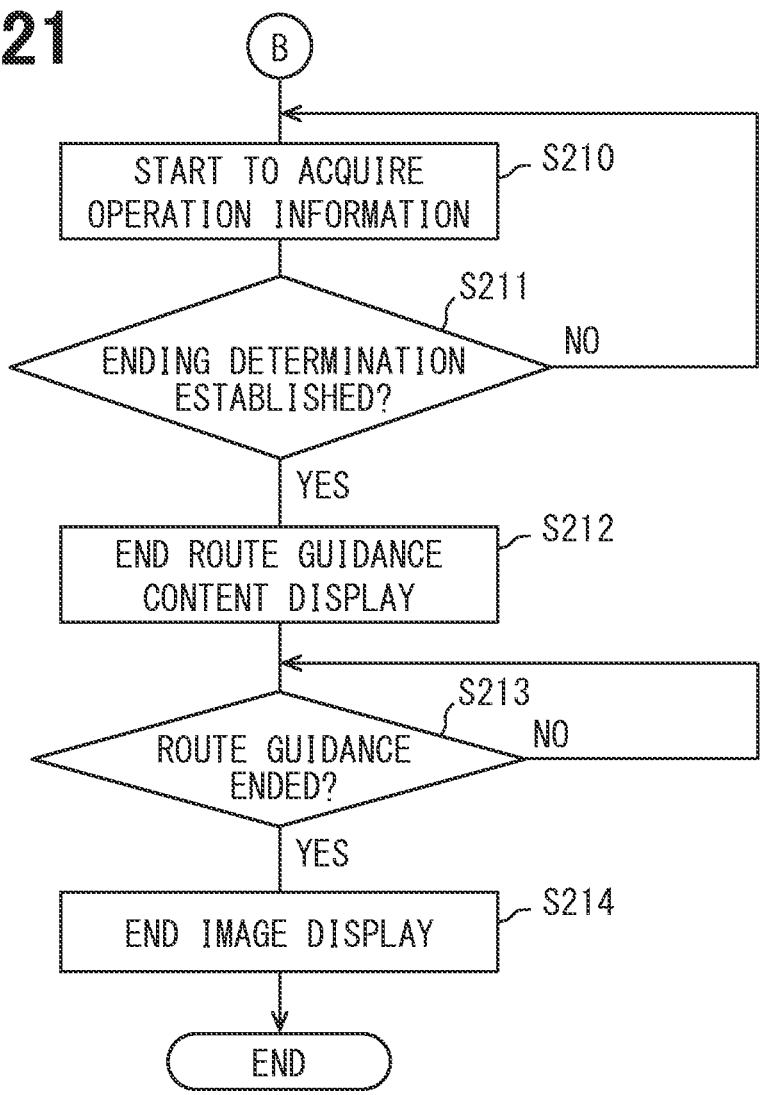
FIG. 21 is a flowchart illustrating the details of the display control processing together with FIG. 20.

In S201 of the display control processing shown in FIGS. 20 and 21, the detailed route information of the guidance area GA generated by the navigation information generation unit 272 is prepared for drawing the TBT image Pmg (see FIGS. 4 and 10), the route guidance content CTsg (see FIGS. 5 and 11), and the like. Then, in S202 and S203, the external information and the map data are acquired, and the process proceeds to S204. In S203, priority is given to the acquisition of high-precision map data from the locator 40. When the high-precision map data is not acquired, the navigation map data is acquired from the navigation map DB 25.

In S204, the HUD 20 is caused to start displaying of the route guidance content CTsg using the information acquired in S201 to S203, and the process proceeds to S205. In S204, the display of the route guidance image Png (see FIGS. 4 and 10) by the navigation display 24 and the display of the TBT image Pmg by the meter display 23 are also started.

In S205 to S209, in the similar manner to S105 to S109 (see FIG. 15) of the first embodiment, the conditions for establishing the end determination according to the presence or absence of the high-precision map data and the presence or absence of the camera recognition information are set, and the process proceeds to S210. In addition, in S205 to S209, the conditions for establishing the end determination are adjusted according to the road shape of the guidance area GA, the presence or absence of the stop line ROc, the direction of turning left or right, and the like. In S210, acquisition of the driver's operation information is started, and the process proceeds to S211.

In S211, it is determined whether or not the end condition set in S206, S208 or S209 is fulfilled by using the external information (and the operation information). When it is determined in S211 that the end condition is fulfilled, the process proceeds to S212. In S212, the display of the route guidance content CTsg is ended based on the establishment of the end determination in S211, and the process proceeds to S213.

In S213, it is determined whether or not the vehicle A has reached the end point of the route guidance (see point P4 in FIG. 4). When it is determined in S213 that the vehicle A has reached the end point of the route guidance, the process proceeds to S214. In S214, both the display of the route guidance image Png on the navigation display 24 and the display of the TBT image Pmg on the meter display 23 are terminated, and the display control processing is ended. As described above, the display of the route guidance content CTsg is ended earlier than the end of the display of the route guidance image Png based on the end determination of S211 using at least the external information.

Also in the second embodiment described so far, the similar effects to those of the first embodiment are achieved. Further, by implementing the end determination using the external information, the display of the route guidance content CTsg is ended at a timing earlier than the end of the display of the route guidance image Png. Based on the above, it is less likely that the attractive route guidance content CTsg, which is highly attractive, will continue to be displayed even after the end of the right or left turn. Therefore, it is possible to present information that does not give a sense of discomfort to the occupant such as the driver.

In addition, also in the second embodiment, the HCU 100 provides the guidance for the automatic lane change by the same display control processing (see FIGS. 15 and 16) as in the first embodiment in the scene where the automatic lane change is performed by the LCA function. As a result, the display end timing of the LCA content CTIc can be appropriately set based on the end determination using the external information. Based on the above, it is less likely that the LCA content CTIc, which is highly attractive, will continue to be displayed even though the lane change has been completed. Therefore, even in the scene of the lane change, it is possible to present information that does not give a sense of discomfort to the occupant such as the driver. In the second embodiment, the navigation display 24 corresponds to the "screen display".

OTHER EMBODIMENTS

Although the plurality of embodiments and modifications of the present disclosure have been described above, the present disclosure is not construed as being limited to the above embodiments and modifications, and various embodiments and various combinations thereof are made without departing from the gist of the present disclosure.

Figure 22:
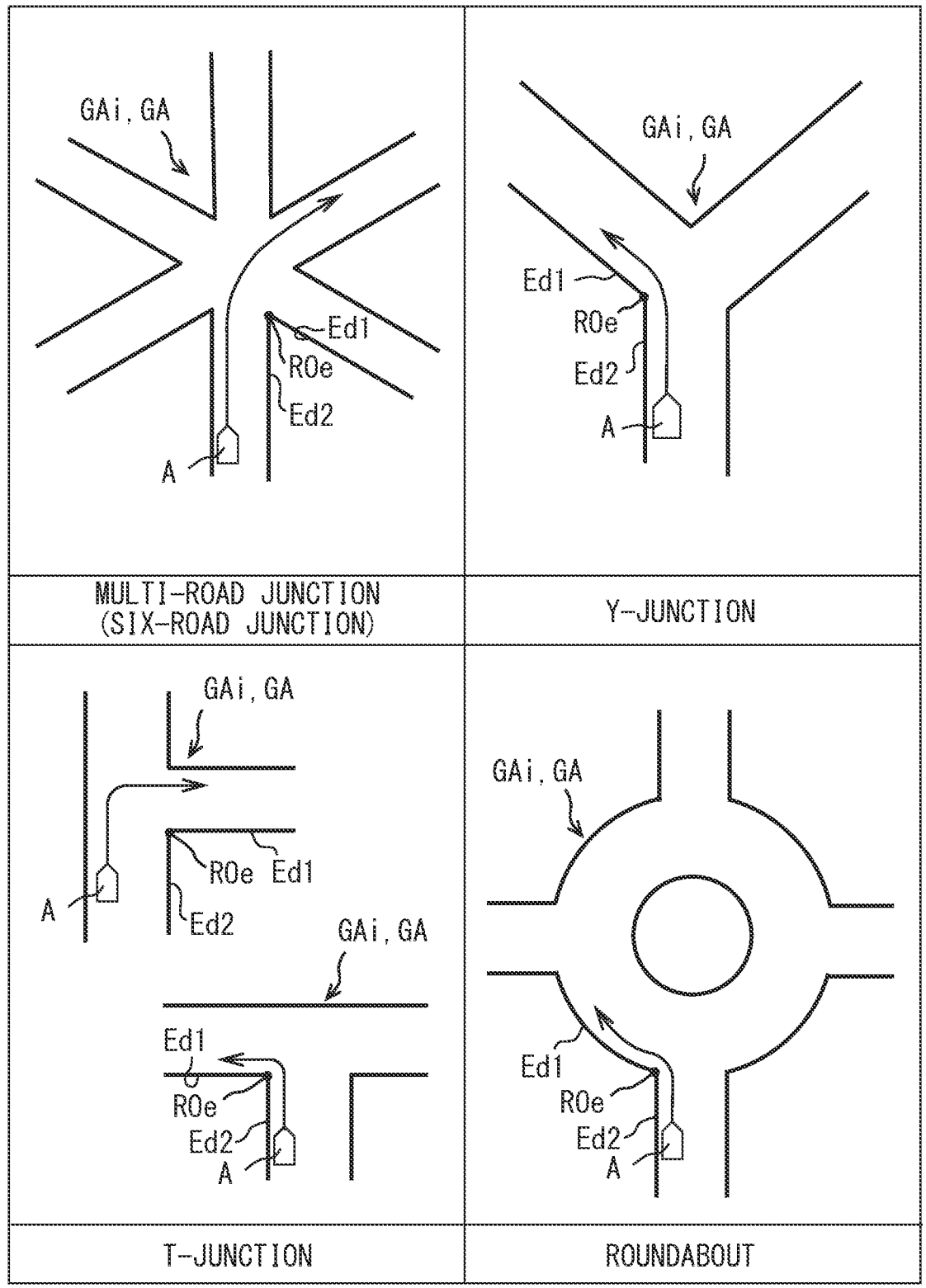
FIG. 22 is a diagram illustrating a specific example of a method for detecting an edge of a road in a guidance area for a road shape in each intersection.

In the embodiment described above, the control information acquisition unit 74 acquires the relative position information of the edge intersection ROe that is at a position before the intersection GAi and on the turning side in the intersection GAi as the intersection target information. The shape of such an intersection GAi is not limited to the crossroads. The control information acquisition unit 74 can detect the edges Ed1 and Ed2 that are on the side near to the subject vehicle and on the turning side in various intersections GAi such as a multi-road junction (6-road junction), a Y-junction road, a T-junction, and a roundabout as shown in FIG. 22, and acquire the relative position information of the edge intersection ROe.

Figure 23:
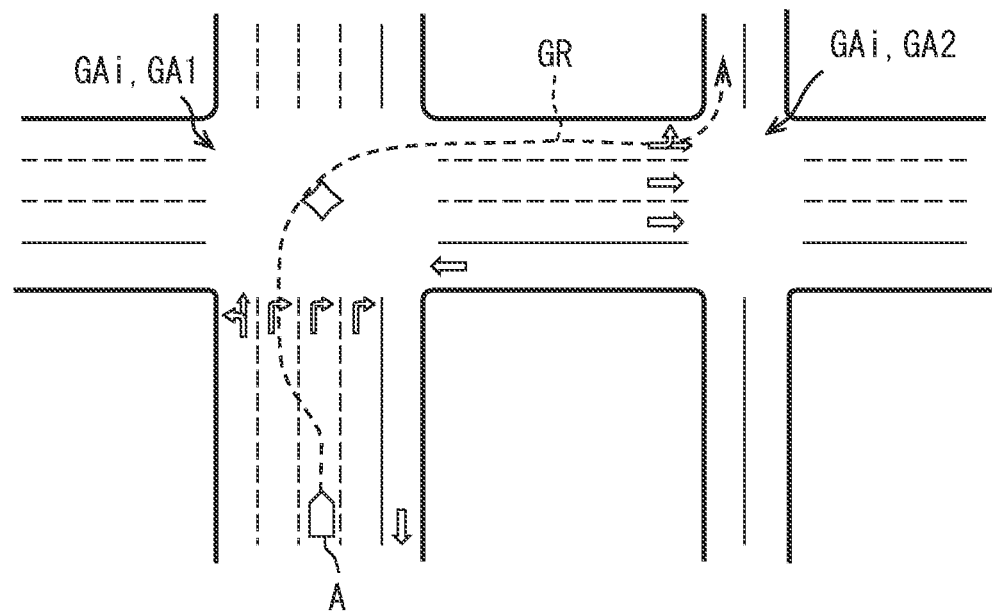
FIG. 23 is a diagram illustrating an example of a traveling route to guide a vehicle in a continuous route guidance at an intersection including multiple lanes.

The navigation device 55 and the navigation information generation unit 272 of the embodiment described above can carry out complex route guidance when right and left turns are continuous through a plurality of intersections GAi. As an example, as shown in FIG. 23, when the right turn at the intersection GAi which is the first guidance area GA1 and the left turn at the intersection GAi which is the second guidance area GA2 are continuous, the route guidance considering the left turn in the second guidance area GA2 is carried out in the first guidance area GA1.

Figure 24:
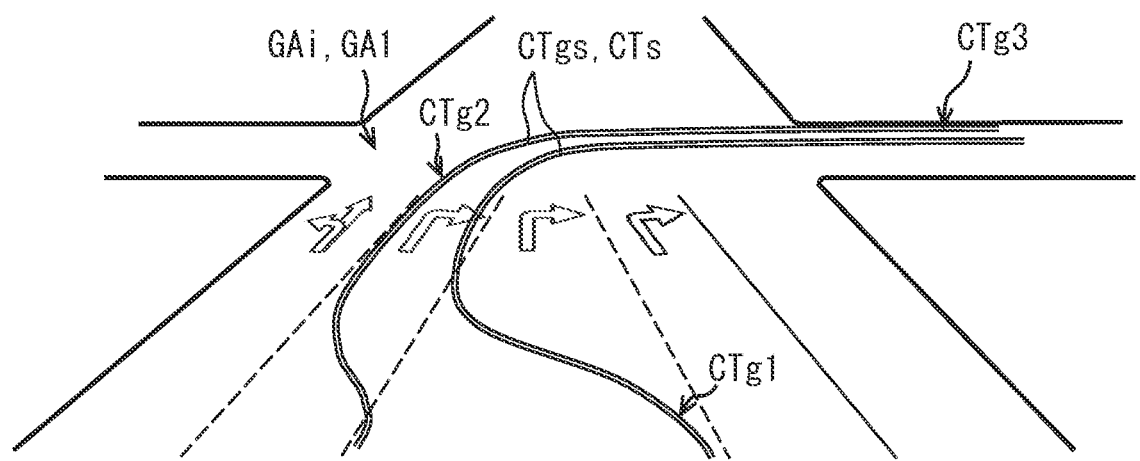
FIG. 24 is a diagram for explaining a concept of a route guidance content in the continuous route guidance shown in FIG. 23.

Specifically, in the guidance route GR generated by the navigation device 55 or the navigation information generation unit 272, the vehicle A is guided to the leftmost lane among the plurality of right turn lanes in an approach section to the first intersection GAi. This leftmost right turn lane is a lane connecting to the left turn lane in the second intersection GAi. When the vehicle A is traveling in a lane other than the leftmost lane among a plurality of right turn lanes, as shown in FIG. 24, the guidance of the lane change toward the left end right turn lane is carried out by the route guidance content CTsg in the approach section to the first intersection GAi.

More specifically, the route guidance content CTsg has a mode including an approach portion CTg1 indicating a route to the intersection GAi, a position portion CTg2 indicating an entry position to the intersection GAi, and an exit direction portion CTg3 indicating an exit direction from the intersection GAi. In the complex route guidance, the detailed route information acquired by the HCU100 additionally includes advance preparation information for instructing to change lanes to the leftmost right turn lane in the approach section for a left turn at the second intersection GAi. Based on such advance preparation information, the HCU 100 generates an approach portion CTg1 in a manner of inducing a guidance of a lane change to the left side. If the lane change to the right turn lane at the left end is completed according to the guidance by the route guidance content CTsg, the vehicle A can smoothly make a left turn at the second intersection GAi.

Figure 25:
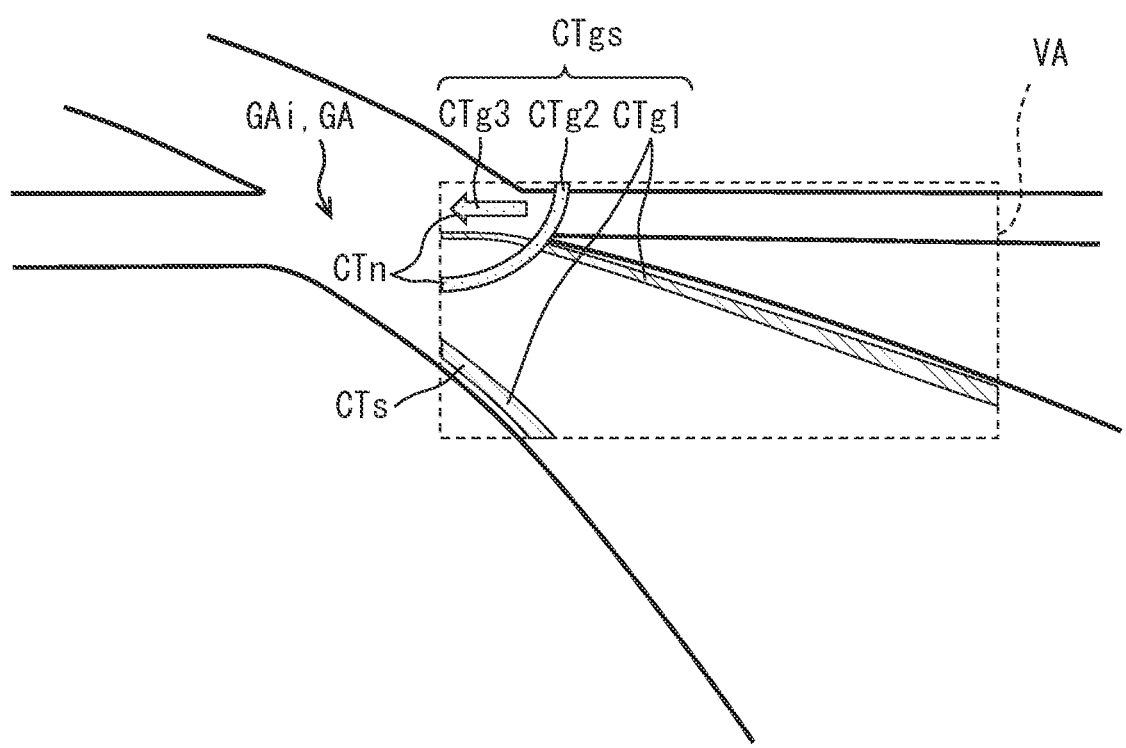
FIG. 25 is a diagram illustrating a display example of a route guidance content used for a route guidance when an intersection is outside the angle of view.

As shown in FIG. 25, in a case where the intersection GAi is outside the angle of view VA until just before reaching the intersection GAi due to the road shape and slope of the guidance area GA, the mode of the route guidance content CTsg is changed. As an example, the HCU 100 causes to display the approach portion CTg1 as the superimposition content CTs, while causing to display the position portion CTg2 and the exit direction portion CTg3 as the non-superimposition content CTn. The approach portion CTg1 has a strip-like extending shape attached to the road surface, similar to the route guidance content CTsg (see FIG. 5) of the embodiment described above. On the other hand, the position portion CTg2 and the exit direction portion CTg3 are displayed at one of the four corners of the angle of view VA having a horizontally long rectangular shape, the one being closest to the intersection GAi. The position portion CTg2 is displayed in a partial annular shape that emphasizes the corner of the angle of view VA, so as to emphasize the intersection outside the angle of view VA. The exit direction portion CTg3 is displayed in the shape of an arrow indicating the turning direction at the intersection GAi. When the guidance for the left turn is carried out at the intersection GAi, the exit direction portion CTg3 has a shape pointing to the left direction.

In the embodiments described above, the conditions for establishing the end determination of the route guidance content CTsg are changed according to the presence or absence of the camera recognition information in addition to the presence or absence of the high-precision map data. However, as a first modification of the embodiments described above, the presence or absence of the camera recognition information is not reflected in the change of the condition for establishing the end determination. That is, in the first modification, S107 and S108 (see FIG. 15) or S207 and S208 (see FIG. 20) are omitted in the display control processing.

In the embodiments described above, the display of the superimposition content is ended based on the end determination using at least the external information. However, as a second modification of the embodiments described above, the display control unit performs an end determination using at least the high-precision map data or the navigation map data and the position information of the subject vehicle, instead of the end determination using at least the external information. Then, the display control unit specifies the position of the subject vehicle with respect to the guidance area based on the end determination using at least the high-precision map data or the navigation map data and the position information of the subject vehicle, and ends the display of the superimposition content. Even by such a display control processing, the display of the superimposition content can be appropriately ended.

In the embodiments described above, the stop line ROc, the sidewalk lines ROa and ROb, the road sign, and the like are recognized mainly based on the detection information (captured image) of the front camera 31, and are provided to the HCU 100 as the external information. Then, the display generation unit 76 performs the end determination using the information of these targets. However, for example, when information such as the stop line ROc and the sidewalk lines ROa and ROb is added to the navigation map data, the display generation unit 76 can perform the end determination by further using these information.

The conditions for establishing the end determination adopted by the display generation unit 76 may be determined based on the angle of view VA of the HUD 20. More specifically, when the angle of view VA of the HUD 20 is expanded to the depression angle side, the superimposition possible range of the superimposition content CTs is also expanded to the side close to the subject vehicle. As a result, even if the display end timing of the superimposition content CTs is delayed, the superimposition content CTs remains attached to the superimposition target. Therefore, it is preferable that the display end timing of the superimposition content CTs is set so as to coincide with the timing when the superimposition target frames out from the angle of view VA.

As a third modification of the embodiment described above, the route guidance content CTsg is superimposed and displayed in such a manner as to fill a range of the road surface corresponding to the guidance route. Further, the LCA content CTlc of the third modification has a double-line shape extending from the subject vehicle lane Lns toward the adjacent lane Lnd according to the shape of the scheduled traveling trajectory PLC. Moreover, the LTC content CTlt of the third modification has a double-line shape superimposed on the vicinity of the left and right section lines of the subject vehicle lane Lns and extending along the left and right section lines.

As a fourth modification of the embodiments described above, the route guidance content CTsg has a single linear shape superimposed on the center of the road surface of the traveling lane corresponding to the guidance route, and extending in the traveling direction. Further, the LCA content CTlc of the fourth modification has a single linear shape indicating the shape of the scheduled traveling trajectory PLC. Moreover, the LTC content CTlt of the fourth modification is superimposed and displayed in such a manner as to fill the road surface of the subject vehicle lane Lns.

As the third and fourth modifications, the display mode of each superimposition content CTs may be appropriately changed. Further, the modes of the route guidance content CTsg, the LCA content CTlc and the LTC content CTlt may be the same as each other or may be different from each other.

In the embodiments described above, the conditions for establishing the end determination of the route guidance content CTsg are changed according to the road shapes of the intersection GAi, the branch point GAj, and the confluence, the presence or absence of the high-precision map data and the presence or absence of the camera recognition information. The conditions for establishing the end determination are further changed depending on the presence or absence of the stop line ROc and the direction of turning left or right at the intersection GAi. However, at least a part of these information may not be used for changing or adjusting the conditions for establishing the end determination. Alternatively, the conditions for establishing the end determination may be constant, regardless of the road shape, the accuracy of the map data, and the like, Further, the conditions for establishing the end determination of the LCA content CTlc may also be changed depending on whether or not the high-precision map data and the camera recognition information can be acquired. In addition, the map data that can be acquired by the HCU 100 may be only one of the high-precision map data and the navigation map data. Further, in addition to the external information and the operation information, any other information acquired by the HCU 100 may be used for the end determination.

The imaging data used as the camera recognition information is not limited to the data captured by the front camera 31. For example, external information based on the imaging data captured by a rear camera, a front side camera, and a rear side camera may be used as camera recognition information for generating the superimposition content.

In the embodiments described above, each of the contents may have a static element such as display color, display brightness, or a reference display shape, or a dynamic element such as a presence or absence of blinking, a blinking cycle, a presence or absence of animation, or an operation of animation, and such static element and dynamic element may be changed appropriately. Also, the static or dynamic element of each content may be variable according to the driver's preferences. Further, the traveling scenes illustrated to describe the embodiments and modifications above are merely examples. The HCU 100 can perform a route guidance display using both the non-superimposition content and superposition content in any driving scenes different from the above.

In the HCU 100 of the embodiments described above, the projection shape and projection position of the virtual image light for forming the superimposition content are sequentially controlled using the position information of the eye point detected by the DSM so that the superimposition content is superimposed on the superimposition target without deviation when viewed from the driver. As a fifth modification of the embodiments described above, the HCU 100 controls the projection shape and projection position of the virtual image light for forming the superimposition content, without using the detection information of the DSM, but using the setting information of the center of the reference eye point set in advance.

As a sixth modification of the embodiments described above, the HUC 100 sequentially controls the projection shape and projection position of the virtual image light for forming the superimposition content by using the detection information of a gyro sensor, for example, provided in the HUD 100, in addition to the position information of the eye point detected by the DSM. The gyro sensor is an attitude sensor that mainly detects the attitude of the vehicle A in the pitch direction. According to the use of the attitude sensor for detecting the vehicle attitude, the superimposition content can be superimposed on the superimposition target more accurately.

As a seventh modification, the projector 21 of the HUD 20 is provided with an electro luminescence (EL) panel, in place of the LCD panel and the backlight. Further, the HUD 20 may employ a projector using a display such as a plasma display panel, a cathode ray tube and an LED, in place of the EL panel.

As an eight modification, the HUD 20 is provided with a laser module (hereinafter referred to as LSM) and a screen, in place of the LCD and the backlight. The LSM includes, for example, a laser light source, a micro electro mechanical systems (MEMS) scanner, and the like. The screen is, for example, a micro-mirror array or a micro-lens array. In such a HUD 20, a display image is drawn on the screen by scanning the laser beam emitted from the LSM. The HUD 20 projects the display image drawn on the screen onto the windshield by the magnifying optical element, and displays the virtual image in the air.

As a ninth modification, the HUD 20 is provided with a DLP (Digital Light Processing, registered trademark) projector. The DLP projector has a digital mirror device (hereinafter referred to as DMD) provided with a large number of micro-mirrors, and a projection light source that projects light toward the DMD. The DLP projector draws a display image on the screen under the control of linking the DMD and the projection light source.

As a tenth modification, the HUD 20 is provided with a projector using LCOS (Liquid Crystal On Silicon). Further, as an eleventh modification, the HUD 20 is provided with a holographic optical element as one of the optical systems for displaying the virtual image Vi in the air.

As a twelfth modification of the embodiments described above, the HCU 100 and the HUD 20 are integrally configured. That is, the control circuit of HUD 20 is equipped with the processing function of the HCU. Further, as a thirteenth modification, the HCU is provided as a meter ECU.

As a fourteenth modification of the embodiment described above, the HCU 100 is provided with a camera image acquisition unit that acquires the imaged data obtained by capturing the foreground of the subject vehicle, which is the imaged data of the front camera 31. The display generation unit 76 generates video data obtained by superimposing original images such as route guidance content CTsg, LCA content CTlc, and LTC content CTlt on a real image of the foreground based on the imaged data. Based on such video data, the HUD 20 displays, as a virtual image, a video in which each content is superimposed on a real image in the foreground. As described above, when the angle of view VA of the HUD 20 is not sufficient, the virtual image display in which the original image such as the content used for the AR display is superimposed on the real image may be performed.

In the embodiments described above, the respective functions provided by the HCU 100 can be also provided by software and hardware for executing the software, only software, only hardware, and complex combinations of software and hardware. In cases where these functions are provided by electronic circuits as hardware, the respective functions can be also provided by analog circuits or digital circuits which include a large number of logic circuits.

Further, the form of the storage medium (non-transitory tangible computer readable medium, non-transitory tangible storage medium) for storing the program or the like that can realize the above display control may be changed as appropriate. For example, the storage medium is not limited to the configuration provided on the circuit board, and may be provided in the form of a memory card or the like. The storage medium may be inserted into a slot portion, and electrically connected to the control circuit of the HCU. The storage medium may include an optical disk which forms a source of programs to be copied into a HCU, a hard disk drive therefor, and the like.

The vehicle equipped with the HMI system is not limited to a general private car, but may be a rented vehicle, a vehicle for man-driving taxi, a vehicle for sharing vehicle service, a freight vehicle, a bus, or the like. Further, the HMI system including the HCU may be installed in a driverless vehicle used for the mobility service.

The vehicle equipped with the HMI system may be a right-hand drive vehicle or a left-hand drive vehicle. Further, the traffic environment in which the vehicle travels may be a traffic environment premised on left-hand traffic, or may be a traffic environment premised on right-hand traffic. The lane keeping control and its related display according to the present disclosure are appropriately optimized according to the road traffic law of each country and region, the steering wheel position of the vehicle, and the like.

The control unit and the method thereof described in the present disclosure may be implemented by a special purpose computer which includes a processor programmed to execute one or more functions implemented by computer programs. Also, the device and the method therefor described in the present disclosure may be realized by a special purpose hardware logic circuit. Further, the device and the method therefor described in the present disclosure may be realized by one or more dedicated computers which are constituted by combinations of a processor for executing computer programs and one or more hardware logic circuits. The computer program may be stored, as instructions to be executed by a computer, in a tangible non-transitory computer-readable medium.

What is claimed is:

1. A display control device for a vehicle to control a head-up display, the vehicle being equipped with a navigation device for performing a route guidance, the display control device comprising:
    a navigation information acquisition unit configured to acquire navigation information related to the route guidance performed by the navigation device;
    an external information acquisition unit configured to acquire external information based on recognition of a traveling environment around the vehicle; and
    a display control unit configured to cause the head-up display to display a superimposition content for providing a route guidance to be superimposed on a foreground in a guidance area where the route guidance by the navigation device is performed, wherein
    the display control unit is configured to cause the head-up display to end a display of the superimposition content at a timing before the vehicle passes through the guidance area, based on an end determination using at least the external information, without using an end notification that notifies an end of the route guidance by the navigation device.

2. The display control device according to claim 1, wherein
    the guidance area includes an intersection where the vehicle is scheduled to make a left turn or a right turn.

3. The display control device according to claim 2, wherein
    the external information acquisition unit acquires, as the external information, intersection target information based on recognition of a target related to the intersection, and
    the display control unit causes the head-up display to end the display of the superimposition content based on the end determination using the intersection target information.

4. The display control device according to claim 2, wherein
    in response to the intersection included in the guidance area being a predetermined complex intersection, the display control unit changes a condition for establishing the end determination so that a timing to end the display of the superimposition content is later than that when the intersection is not the complex intersection.

5. The display control device according to claim 2, wherein
    in response to the guidance area having a stop line before the intersection, the display control unit changes a condition for establishing the end determination so that a timing to end the display of the superimposition content is later than that in the guidance area without having the stop line.

6. The display control device according to claim 2, wherein in response to the vehicle being scheduled not to cross an oncoming lane in a right turn or a left turn at the intersection included in the guidance area, the display control unit changes a condition for establishing the end determination so that a timing to end the display of the superimposition content is later than that when the vehicle is scheduled to cross the oncoming lane at the intersection.

7. The display control device according to claim 1, wherein the guidance area includes a junction where the vehicle is scheduled to change lanes, the external information acquisition unit is configured to acquire, as the external information, point target information based on recognition of a target related to the junction, and the display control unit is configured to cause the head-up display to end the display of the superimposition content based on the end determination using the point target information.

8. The display control device according to claim 1, wherein the external information acquisition unit is configured to acquire, as the external information, edge position information obtained by detecting a road edge in the guidance area, and the display control unit is configured to cause the head-up display to end the display of the superimposition content based on the end determination using the edge position information.

9. The display control device according to claim 1, wherein the display control unit is configured to change a condition for establishing the end determination according to a road shape in the guidance area.

10. The display control device according to claim 1, wherein the display control unit is configured to cause the head-up display to display a non-superimposition content for continuing the route guidance in a display period after the display of the superimposition content is ended, and the display control unit is configured to change a mode of the non-superimposition content so as to lower a visibility of the non-superimposition content in the display period.

11. The display control device according to claim 1, further comprising:

a map data acquisition unit configured to acquire low-precision map data and high-precision map data having an accuracy higher than that of the low-precision map data, as map data used in the display control unit to generate the superimposition content, wherein the display control unit is configured to change a condition for establishing the end determination based on whether or not the high-precision map data is acquired.

12. The display control device according to claim 11, wherein when the superimposition content is generated by using the high-precision map data, the display control unit is configured to change a condition for establishing the end determination so that the display of the superimposition content is more difficult to end than that when the superimposition content is generated using the low-precision map data.

13. The display control device according to claim 1, wherein the external information acquisition unit is configured to acquire, as the external information, camera recognition information based on data captured by an in-vehicle camera mounted on the vehicle, and when the superimposition content is generated by using the camera recognition data, the display control unit is configured to change a condition for establishing the end determination so that the display of the superimposition content is more difficult to end than when the superimposition content is generated without using the camera recognition data.

14. The display control device according to claim 1, further comprising:

an operation information acquisition unit configured to acquire operation information related to an operation of an occupant of the vehicle, wherein the display control unit is configured to cause the head-up display to end the display of the superimposition content based on the end determination using the operation information in addition to the external information.

15. A display control device for a vehicle to control a screen display and a head-up display, the display control device comprising:

an external information acquisition unit configured to acquire external information based on recognition of a traveling environment around the vehicle; and a display control unit configured to cause the head-up display to display a superimposition content for providing a route guidance to be superimposed on a foreground in a guidance area where the display control unit causes the screen display to display a route guidance image, wherein the display control unit is configured to cause the head-up display to end a display of the superimposition content at a timing before the display control unit causes the screen display to end a display of the route guidance image and before the vehicle passes through the guidance area, based on an end determination using at least the external information.

16. A display control device for a vehicle to control a head-up display, the vehicle being equipped with a navigation device for performing a route guidance, the display control device comprising:

a navigation information acquisition unit configured to acquire navigation information related to the route guidance performed by the navigation device;

an external information acquisition unit configured to acquire external information based on recognition of a traveling environment around the vehicle; and a display control unit configured to cause the head-up display to display a superimposition content for providing a route guidance to be superimposed on a foreground in a guidance area where the navigation device displays a route guidance image on a screen, wherein the display control unit is configured to cause the head-up display to end a display of the superimposition content at a timing before the navigation device ends a display of the route guidance image and before the vehicle passes through the guidance area, based on an end determination using at least the external information.

17. A display control device for a vehicle to control a head-up display, the vehicle having a lane change function, the display control device comprising:
- an external information acquisition unit configured to acquire external information based on recognition of a traveling environment around the vehicle, and
- a display control unit configured to
  - cause the head-up display to display a superimposition content indicating a moving direction in a lane change performed by the lane change function to be superimposed on a foreground, and
  - cause the head-up display to end a display of the superimposition content, at a timing before a drive control of the vehicle is transitioned from the lane change to an in-lane traveling, based on an end determination using at least the external information.

18. The display control device according to claim 17, wherein
- the display control unit is configured to control a screen display,
- the display control unit is configured to cause the screen display to display a lane change image to notify an execution of the lane change by the lane change function, and
- the display control unis is configured to cause the head-up display to end the display of the superimposition content, before ending the display of the lane change image by the screen display, based on the end determination using at least the external information.

19. A display control program product for controlling a head-up display of a vehicle that is equipped with a navigation device for performing a route guidance, the display control program product being stored on a non-transitory computer readable medium, and comprising instructions configured to, when executed by one or more processors, cause the one or more processors to:
- acquire navigation information related to the route guidance performed by the navigation device;
- acquire external information based on recognition of a traveling environment around the vehicle;
- cause the head-up display to display a superimposition content for providing a route guidance to be superimposed on a foreground in a guidance area where the route guidance is performed by the navigation device; and
- cause the head-up display to end a display of the superimposition content at a timing before the vehicle passes through the guidance area, based on an end determination using the external information, without using an end notification that notifies an end of the route guidance by the navigation device.

20. A display control program product for controlling a screen display and a head-up display of a vehicle, the display control program product being stored on a non-transitory computer readable medium, and comprising instructions configured to, when executed by one or more processors, cause the one or more processors to:
- acquire external information based on recognition of a traveling environment around the vehicle;
- cause the head-up display to display a superimposition content for providing a route guidance to be superimposed on a foreground in a guidance area in which the screen display is caused to display a route guidance image on a screen; and
- cause the head-up display to end a display of the superimposition content, at a timing before ending a display of the route guidance image by the screen display and before the vehicle passes through the guidance area, based on an end determination using at least the external information.

21. A display control program product for controlling a head-up display of a vehicle that is equipped with a navigation device for performing a route guidance, the display control program product being stored on a non-transitory computer readable medium, and comprising instructions configured to, when executed by one or more processors, cause the one or more processors to:
- acquire navigation information related to the route guidance performed by the navigation device;
- acquire external information based on recognition of a traveling environment around the vehicle;
- cause the head-up display to display a superimposition content for providing a route guidance to be superimposed on a foreground in a guidance area in which the navigation device displays a route guidance image on a screen; and
- cause the head-up display to end a display of the superimposition content at a timing before the navigation device ends a display of the route guidance image and before the vehicle passes through the guidance area, based on an end determination using at least the external information.

22. A display control program product for controlling a head-up display of a vehicle having a lane change function, the display control program product being stored on a non-transitory computer readable medium, and comprising instructions configured to, when executed by one or more processors, cause the one or more processors to:
- acquire external information based on recognition of a traveling environment around the vehicle in a scene where a lane change is performed by the lane change function;
- cause the head-up display to display a superimposition content indicating a moving direction in the lane change to be superimposed on a foreground; and
- cause the head-up display to end a display of the superimposition content at a timing before a drive control is transitioned from the lane change to an in-lane traveling, based on an end determination using at least the external information.

* * * * *